(12) United States Patent
Hoppe et al.

(10) Patent No.: US 6,850,233 B2
(45) Date of Patent: Feb. 1, 2005

(54) SYSTEMS AND METHODS FOR OPTIMIZING GEOMETRIC STRETCH OF A PARAMETRIZATION SCHEME

(75) Inventors: Hugues Herve Hoppe, Redmond, WA (US); John Michael Snyder, Redmond, WA (US); Pedro Vieira Sander, Cambridge, MA (US); Steven Jacob Gortler, Cambridge, MA (US)

(73) Assignee: Microsoft Corporation, Redmond, WA (US)

( * ) Notice: Subject to any disclaimer, the term of this patent is extended or adjusted under 35 U.S.C. 154(b) by 254 days.

(21) Appl. No.: 10/138,751

(22) Filed: May 1, 2002

(65) Prior Publication Data

US 2003/0206165 A1 Nov. 6, 2003

(51) Int. Cl.⁷ .............................................. G06T 17/00
(52) U.S. Cl. ..................................................... 345/420
(58) Field of Search ................................ 345/420, 419, 345/421, 422, 423

(56) References Cited

U.S. PATENT DOCUMENTS

| | | | | | |
|---|---|---|---|---|---|
| 5,956,133 A | * | 9/1999 | Imura | ........................... | 345/420 |
| 5,963,209 A | * | 10/1999 | Hoppe | ......................... | 345/419 |
| 6,046,744 A | * | 4/2000 | Hoppe | ......................... | 345/419 |
| 6,285,372 B1 | * | 9/2001 | Cowsar et al. | .............. | 345/420 |
| 6,362,820 B1 | * | 3/2002 | Hoppe | ......................... | 345/423 |
| 6,426,750 B1 | * | 7/2002 | Hoppe | ......................... | 345/428 |
| 6,614,428 B1 | * | 9/2003 | Lengyel | ....................... | 345/420 |

OTHER PUBLICATIONS

AbAdjev, V., et al., "MetaStream," *VRML 1999 Proceedings*, 1999, 53–62.

Cignoni, P. et al., "A general method for recovering attribute values on simplified meshes," *IEEE Visualization*, 1998, 59–67.

Cohen, J. et al., "Appearance–preserving simplification," *SIGGRAPH*, 1998, 115–122.

Eck, M. et al., "Multiresolution analysis of arbitrary meshes," *SIGGRAPH*, 1995, 173–182.

Floater, M., "Parametrization and smooth approximation of surface triangulations," *Comp. Aided Geometric Design*, 1997, 14(3), 231–250.

Garland, M. et al., "Hierarchical face clustering on polygonal surfaces," *Symposium on Interactive 3D Graphics*, 2001, 49–58.

(List continued on next page.)

*Primary Examiner*—Don Wong
*Assistant Examiner*—Huedung X. Cao
(74) *Attorney, Agent, or Firm*—Woodcock Washburn LLP

(57) ABSTRACT

Systems and methods are provided for optimizing the geometric stretch of a parametrization scheme. Given an arbitrary mesh, the systems and methods construct a progressive mesh (PM) such that all meshes in the PM sequence share a common texture parametrization. The systems and methods minimize geometric stretch, i.e., small texture distances mapped onto large surface distances, to balance sampling rates over all locations and directions on the surface. The systems and methods also minimize texture deviation, i.e., "slippage" error based on parametric correspondence, to obtain accurate textured mesh approximations. The technique(s) begin by partitioning the mesh into charts using planarity and compactness heuristics. Then, the technique(s) proceed by creating a stretch-minimizing parametrization within each chart, and by resizing the charts based on the resulting stretch. Then, the technique(s) simplify the mesh while respecting the chart boundaries. Next, the parametrization is re-optimized to reduce both stretch and deviation over the whole PM sequence. The charts may then be packed into a texture atlas for improved texture mapping in connection with a parametrization scheme.

40 Claims, 22 Drawing Sheets

(17 of 22 Drawing Sheet(s) Filed in Color)

OTHER PUBLICATIONS

Gortler, S. et al., "The Lumigraph," *SIGGRAPH*, 1996, 43–52.

Guskov, I. et al., "Normal Meshes," *SIGGRAPH*, 2000, 95–102.

Hinker, P. et al., "Geometric Optimization," *IEEE Visualization*, 1993, 189–195.

Hoppe, H., "Progressive Meshes," *SIGGRAPH*, 1996, 99–108.

Hormann, K. et al., "MIPS—an efficient global parametrization method," *Curve and Surface Design*, 1999, 153–162.

Hormann, K. et al., "Hierarachical parametrization of triangulated surfaces," *Vision, Modeling, and Visualization*, 1999, 219–226.

Hunter, A. et al., "Uniform frequency images: adding geometry to images to produce space–efficient textures," *IEEE Visualization*, 2000, 243–251.

Igarashi, T. et al., "Adaptive unwrapping for interactive texture painting," *Symposium on Interactive 3D Graphics*, 2001, 209–217.

Kalvin, A. et al., "SuperFaces: Polyhedral approximation with bounded error," *Image Capture, Formatting, and Display, SPIE Proceedings*, 1994, 22164, 2–13.

Kobbelt, L. et al., "A general framework for mesh decimation," *Proceedings of Graphics Interface*, 1998, 43–50.

Krishnamurthy, V. et al., "Fitting smooth surfaces to dense polygon meshes," *SIGGRAPH*, 1996, 313–324.

Lee, A. et al., "MAPS: Multiresolution adaptive parametrization of surfaces," *SIGGRAPH*, 1998, 95–104.

Lévy, B. et al., "Non–distorted texture mapping for sheared triangulated meshes," *SIGGRAPH*, 1998, 343–352.

Lindstrom, P. et al., "Fast and memory efficient polygonal simplification," *IEEE Visualization*, 1998, 279–287.

Maillot, J. et al., "Interactive texture mapping," *Computer Graphics Proceedings*, 1993, 27–34.

Maruya, M., "Generating texture map from object–surface texture data," *Eurographics '95*, 1995, 14(3), 397–405.

Milenkovic, V., "Rotational polygon containment and minimum enclosure," *Proc. of 14th ACM Symposium on Computational Geometry*, 1998, 8 pages.

Murata, H. et al., "Rectangle–packing–based module placement," *IEEE ICCAD*, 1995, 472–479.

Sander, P. et al., "Silhouette clipping," *SIGGRAPH*, 2000, 327–334.

Sloan, P.–P. et al., "Importance driven texture coordinate optimization," *Eurographics '95*, 1998, 17(3), 97–104.

Soucy, M. et al., "A texture–mapping approach for the compression of colored 3D triangulations," *The Visual Computer*, 1986, 12, 503–514.

Maruya, M., "Generating tetxure map from object–surface texture data," *Computer Graphics Forum(Proceedings of Eurographics '95)*, 1995, 14(3), 397–405.

Milenkovic, V., "Rotational polygon containment and minimum enclosure," *Proc. of 14th Annual Symposium on Computational Geometry*, ACM, 1998.

Murata, H. et al., "Rectangle–packing–based module placement," *IEEE ICCAD*, 1995, 472–479.

Peters, J. et al., "The Simplest Subdivision Scheme for Smoothing Polyhedra," *ACM Trans. on Graphics*, 1997, 16(4), 420–431.

Praun, E. et al., "Lapped Textures," *Proceedings of SIGGRAPH'00: 27th International Conference on Computer Graphics and Interactive Techniques Conference*, New Orleans, LA, Jul. 23–28, 2000.

Rabin, J.M., "The Geometry of the Super Flows," *Comms. Math. Physics*, 1991, 137(3); 533–552.

Sander, P. et al., "Silhouette clipping," *SIGGRAPH*, 2000, 327–334.

Sloan, P.–P. et al., "Importance driven texture coordinate optimization," *Computer Graphics Forum(Proceedings of Eurographics '98)*, 1998, 17(3), 97–104.

Soucy, M.et al., "A texture–mapping approach for the compression of colored 3D triangulations," *The Visual Computer*, 1986, 12, 503–514.

Wallace, R.S., "Modified Hough Transform for Lines," *Proceedings—CVPR '85, IEEE Computer Society Conference on Computer Vision and Pattern Recognition*, San Francisco, CA, Jun. 19–23, 1985, 665–667.

Briggs, W., "A Multigrid Tutorial," *SIAM*, Philadelphia, 1987.

Duchamp, T. et al., "Hierarchical Computation of PL Harmonic Embeddings," *Technical Report*, University of Washington, 1997.

Garland, M. et al., "Surface Simplification Using Quadric Error Metrics," *SIGGRAPH*, 1997, 209–216.

Haker, S. et al., "Conformal Surface Parameterization for Texture Mapping," *IEEE Trans. on Visual. and Comp. Graphics*, 2000, 6(2).

Hoppe, H., "New Quadric Error Metric for Simplifying Meshes with Appearance Attributes," *IEEE Visualization*, 1999, 59–66.

Sander, P. et al., "Texture Mapping Progressive Meshes," *SIGGRAPH*, 2001, 409–416.

Terzopolous, D. et al., "Sampling and Reconstruction with Adaptive Meshes," *CVPR*, 1991, 70–75.

Sander, P. et al, "Signal–Specialized Parametrization," *Eurographics Workshop on Rendering*, 2002, 1–11.

\* cited by examiner

Exact images $L^2 = 2.26$  $L^\infty = 9.86$

FIG. 3B - Prior Art

$L^2 = 2.31$  $L^\infty = 7.46$

FIG. 3C - Prior Art

$L^2 = \infty$  $L^\infty = \infty$

FIG. 3D - Prior Art

$L^2 = 1.57$  $L^\infty = 4.19$

FIG. 3E - Prior Art

$L^2 = 1.22$  $L^\infty = 2.13$ $L^2 = 1.28$  $L^\infty = 1.65$

FIG. 4A
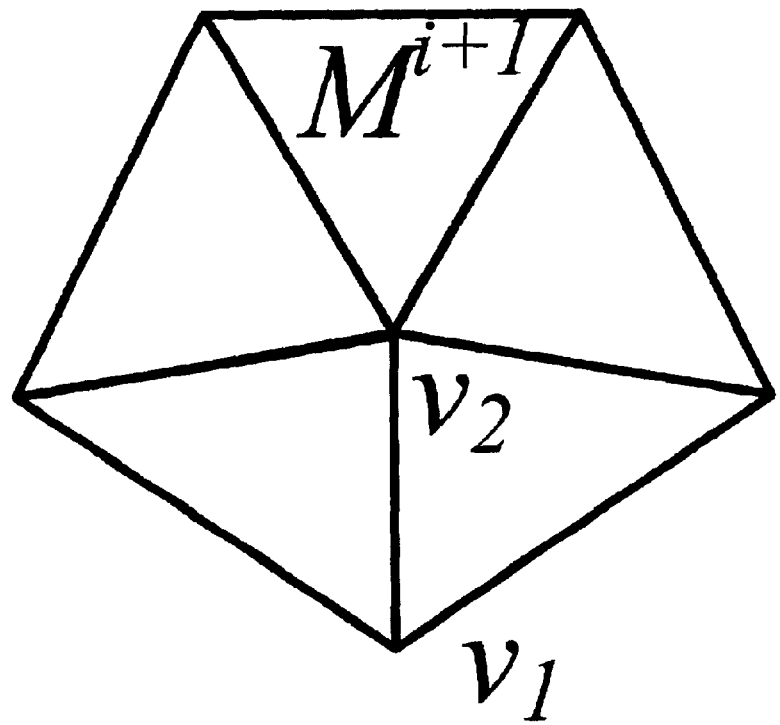
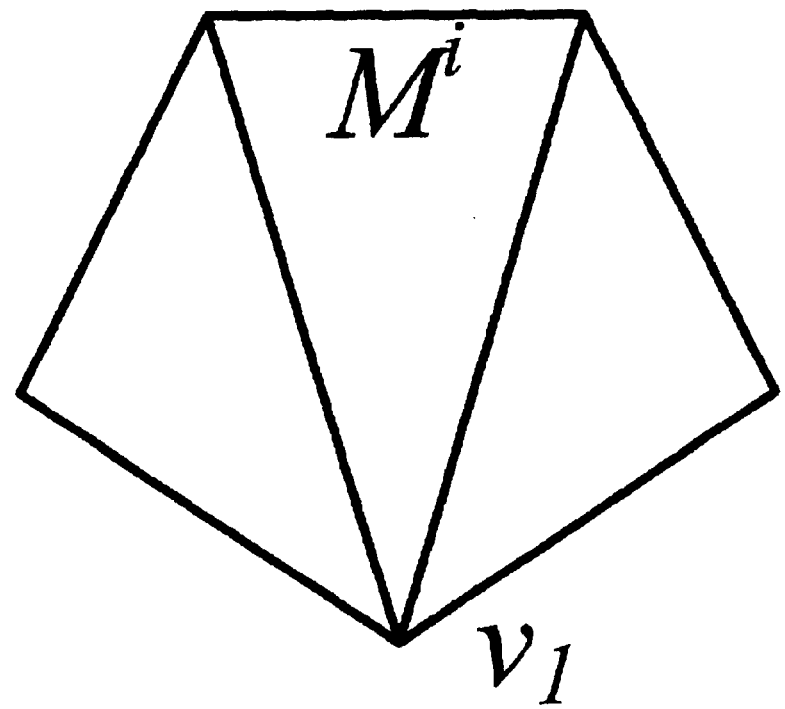
FIG. 4B

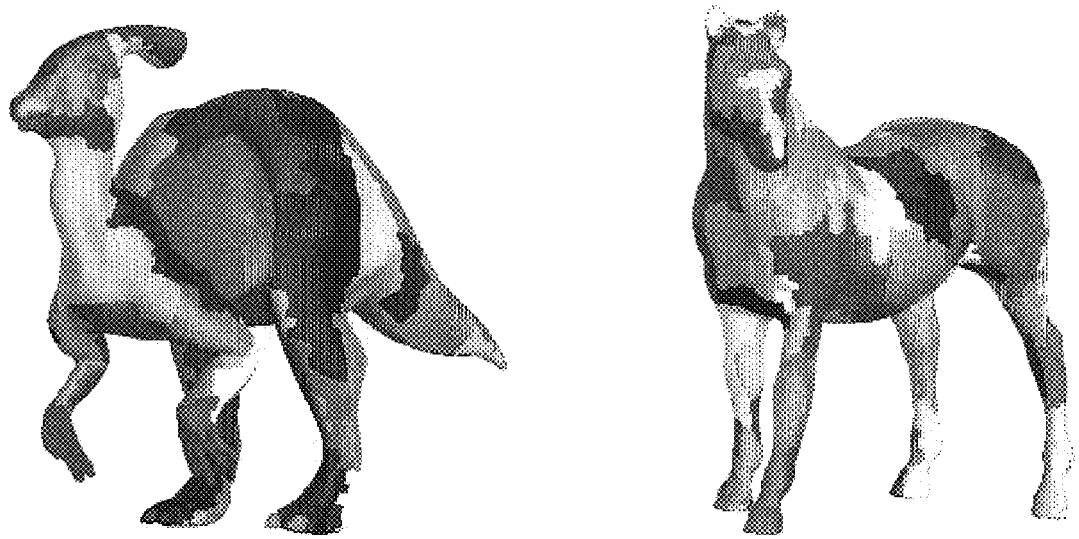
FIG. 5A
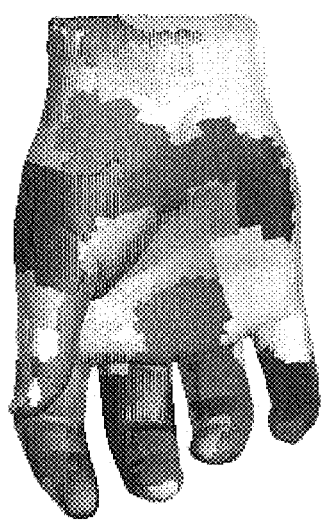

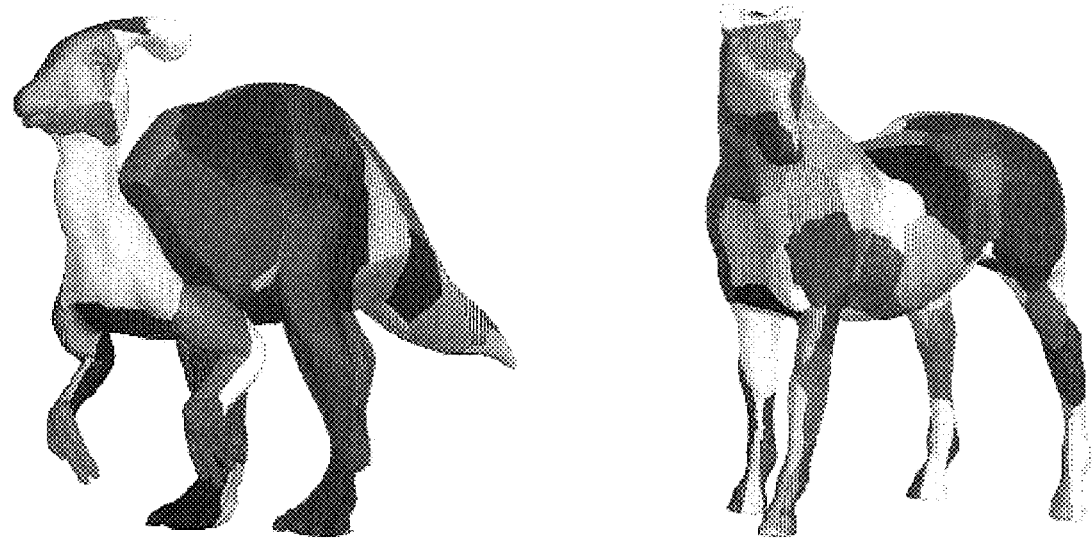
FIG. 5B
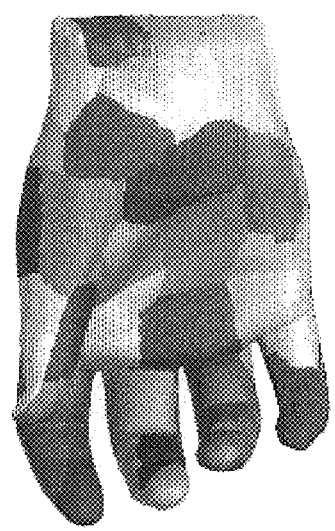

Charts on Original Mesh $M^n$

Base Mesh $M^0$

Texture Atlas (before pull-push)

Textured Base Mesh $M^0$ (470 faces)

$M^{115}$ (700 faces)

$M^{365}$ (1200 faces)

$M^{4765}$ (10000 faces)

Sampled Normal Map - Ignoring Stretch

Hex Grid in 2D Texture Domain – Ignoring Stretch

Sampled Normal Map - Considering Stretch

Hex Grid in 2D Texture Domain - Considering Stretch

SYSTEMS AND METHODS FOR OPTIMIZING GEOMETRIC STRETCH OF A PARAMETRIZATION SCHEME

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright © 2001, Microsoft Corp.

FIELD OF THE INVENTION

The present invention relates to systems and methods for optimizing parametrization schemes in connection with computer graphics. More particularly, the present invention relates to systems and methods for optimizing geometric stretch of a parametrization scheme.

BACKGROUND OF THE INVENTION

A progressive mesh (PM) representation encodes an arbitrary mesh as a simple base mesh $M^0$ and a sequence of n refinement operations called vertex splits. The PM defines an array $\{M^0 \ldots M^n\}$ of level-of-detail (LOD) approximations, and supports geomorphs and progressive transmission. Unlike multiresolution frameworks based on subdivision, the meshes in a PM have irregular connectivities that can accurately model sharp features (e.g., creases and corners) at all scales.

One challenge in the PM framework is handling texture maps. Hardware rasterization features, including bump maps, normal maps, and multitexturing, allow fine detail to be captured in texture images parametrized over the mesh. Processes that implicate sources for textures include sampling detailed scanned meshes, evaluating solid textures, ray tracing, and 3D painting. In this regard, there are various problems associated with parametrizing texture images over all meshes in a PM sequence.

A single unfolding of an arbitrary mesh onto a texture image may create regions of high distortion, so generally a mesh must be partitioned into a set of charts. Each chart is parametrized by a region of a texture domain, and these parametrizations collectively form an atlas, an exemplary one of which is illustrated in FIG. 9C. For instance, several schemes simplify a mesh and then construct a texture image chart over each simplified face by sampling attributes, e.g., normals, from the original mesh.

For a PM, one might consider re-using chart images defined on faces of $M^0$ for all meshes $M^1 \ldots M^n$. However, the problem is that a PM is generally not chart-compliant, in that its vertex splits can change the chart topology when applied indiscriminately near chart boundaries, thereby forcing parametric discontinuities. For example, the vertex split shown in FIG. 1B changes the adjacency of the three colored charts of FIG. 1A, resulting in the discontinuous texture. Fortunately, it is possible to construct a single atlas parametrization for the entire PM sequence. Chart-compliance can be obtained by first defining the charts on the original mesh, and then constraining a simplification sequence to comply with those chart boundaries, as described by Cohen, Olano and Manocha.

With respect to mesh partitioning, there have been several previous techniques that have proposed methods for parametrizing meshes by partitioning into charts. Krishnamurthy and Levoy describe an interactive system in which the user manually lays out chart boundaries by tracing curves. Maillot et al. partition mesh faces according to a bucketing of face normals. Eck et al. use a Voronoi-based partition. These last two algorithms make little effort to adapt charts to surface geometry, so the chart boundaries can hinder simplification, leading to poor LOD approximations.

The technmques of Lee et al. ("MAPS") and Guskov et al. ("Normal Meshes") map edges of the simplified base domain back to the original mesh. While the resulting charts adapt to surface geometry, their boundaries cut across faces of original mesh, requiring addition of new vertices and faces. For the applications described in MAPS and Normal Meshes, these additional vertices are only temporary, because the mesh geometry is subsequently resampled. However, the techniques of MAPS and Normal Meshes are not suited to generating a PM from a user-specified mesh, whose connectivity is often carefully optimized, because the imposition of new vertices is a drawback to such an application.

With respect to chart parametrization, several schemes have been proposed to flatten surface regions to establish a parametrization. These schemes typically obtain the parametrization by minimizing an objective functional. The main distinction between the functionals is how they measure the distance of the parametrization from an isometry, which is a mapping preserving lengths and angles.

Maillot et al. base their metric on edge springs of nonzero rest length, where rest length corresponds to edge length on the surface. To ensure that the parametrization is 1-to-1, i.e., to avoid parametric "buckling," also called "face flipping," they add an area-preservation term to the metric. However, a downside to the technique of Maillot et al. is that when the texture domain boundary is fixed, it is unclear how edge rest-lengths should be scaled. Another downside is that the weighting between the edge springs and the area-preservation term must be adjusted to produce an embedding.

Eck et al. propose the harmonic map, which weights edge springs non-uniformly. The weights can sometimes be negative, in which case an embedding is not guaranteed. Floater proposes a similar scheme with a different edge-spring weighting that guarantees embedding for convex boundaries. For either method, the parametrization can be found by solving a linear system.

Lévy and Mallet combine orthogonality and isoparametric terms in their metric. To solve the resulting nonlinear optimization, they iteratively fix one texture component, s or t, and solve for the other using a linear optimization. As with Lindstrom and Turk, a term is added, which must be sufficiently weighted to guarantee an embedding.

Horman and Greiner propose the MIPS parametrization, which roughly attempts to preserve the ratio of singular values over the parametrization. However, the metric disregards absolute stretch scale over the surface, with the result that small domain areas can map to large regions on the surface.

With respect to appearance preserving simplification, Cohen et al. introduce texture deviation as the appropriate measure of geometric accuracy when simplifying textured meshes. The texture deviation between a simplified mesh $M^i$ and the original mesh $M^n$ at a point $p^i \in M^i$ is defined as $\|p^i - p^n\|$ where $p^n$ is the point on $M^n$ with the same parametric location in the texture domain. Cohen et al. track texture deviation conservatively by storing a bounding error box at each mesh vertex. They demonstrate results on parametric surfaces already organized into charts; however, the techniques of Cohen et al. do not begin with an unparametrized mesh, and then seek to form an atlas parametrization that specifically minimizes texture deviation and stretch over all meshes in a PM.

Thus, it would be desirable to improve upon prior art techniques for providing texture mapping in connection with parametrization schemes. To improve upon prior art techniques, it would be desirable to provide a system that allows all meshes in the PM to share a common texture map. Furthermore, it would be desirable to create domains with straight boundaries between chart corners, unlike, for example, the approaches of Maillot et al., Lévy and Mallet and Hormann and Greiner. It would be still further desirable to provide systems and methods for texture mapping PMs that minimize geometric stretch and texture deviation. It would be still further desirable to substantially balance sampling rates everywhere on the surface by optimizing the geometric stretch of a parametrization scheme. Moreover, it would be advantageous to provide a general solution that begins with an unparametrized mesh, and then forms an atlas parametrization that minimizes texture deviation and stretch over all meshes in a PM.

SUMMARY OF THE INVENTION

In view of the foregoing, the present invention provides systems and methods for optimizing the geometric stretch of a parametrization scheme. Given an arbitrary mesh, the systems and methods construct a progressive mesh (PM) such that all meshes in the PM sequence share a common texture parametrization. The systems and methods minimize geometric stretch, i.e., small texture distances mapped onto large surface distances, to balance sampling rates over all locations and directions on the surface. The systems and methods also minimize texture deviation, i.e., "slippage" error based on parametric correspondence, to obtain accurate textured mesh approximations. The technique(s) begin by partitioning the mesh into charts using planarity and compactness heuristics. Then, the technique(s) proceed by creating a stretch-minimizing parametrization within each chart, and by resizing the charts based on the resulting stretch. Then, the technique(s) simplify the mesh while respecting the chart boundaries. Next, the parametrization is re-optimized to reduce both stretch and deviation over the whole PM sequence. The charts may then be packed into a texture atlas for improved texture mapping in connection with a parametrization scheme.

Other features and embodiments of the present invention are described below.

BRIEF DESCRIPTION OF THE DRAWINGS

The file of this patent includes at least one drawing executed in color. Copies of this patent with color drawings will be provided by the United States Patent and Trademark Office upon request and payment of the necessary fee.

The system and methods for optimizing geometric stretch of a parametrization scheme in accordance with the present invention are further described with reference to the accompanying drawings in which:

FIGS. 3A through 3G compare the metric of the present invention (FIGS. 3F and 3G) with alternatives (FIGS. 3B through 3E) found in the prior art in relation to the exact reproduction of the image shown in FIG. 3A;

FIGS. 4A and 4B illustrate exemplary aspects of a half-edge collapse operation utilized in accordance with the invention;

FIGS. 5A and 5B illustrate the results of the initial chart partition operation in accordance with the invention;

DETAILED DESCRIPTION OF THE INVENTION

Overview

The present invention relates to systems and methods for optimizing the geometric stretch of a parametrization scheme. In various implementations and embodiments, the systems and methods provide (1) algorithm(s) for partitioning a mesh into charts, which considers simplification quality and does not alter the mesh, (2) a geometric stretch metric that uniformly penalizes undersampling everywhere over the surface, (3) algorithm(s) for minimizing this stretch metric in the $L^2$ and $L^\infty$ norms, which can be used for both static meshes and PMs, (4) technique(s) for optimizing the parametrization to minimize both geometric stretch and texture deviation at all PM levels, with appropriate weighting of each mesh in $M^0 \ldots M^n$, (5) technique(s) for creating a PM representation with a consistent surface parametrization for all LODs and (6) technique(s) that form an atlas parametrization from an unparametrized mesh that minimizes texture deviation and stretch over all meshes in a PM.

Exemplary Networked and Distributed Environments

One of ordinary skill in the art can appreciate that a computer or other client or server device can be deployed as part of a computer network, or in a distributed computing environment. In this regard, the present invention pertains to any computer system having any number of memory or storage units, and any number of applications and processes occurring across any number of storage units or volumes, which may be used in connection with a parametrization process. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services.

Distributed computing facilitates sharing of computer resources and services by direct exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices may have applications, objects or resources that may implicate a parametrization process that may utilize the techniques of the present invention.

Figure 1A:
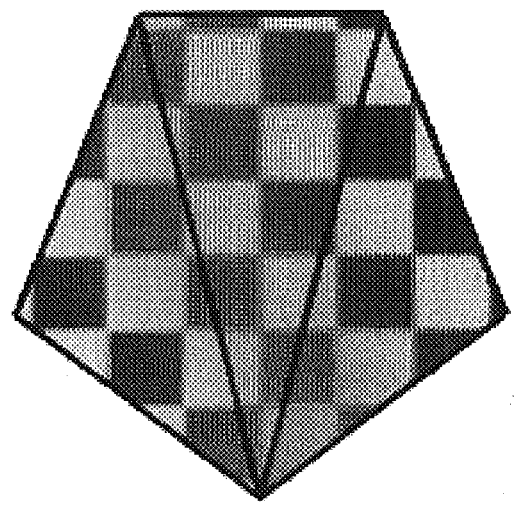
FIGS. 1A and 1B illustrate how a vertex split operation of a parametrization can result in discontinuous texture.
Figure 1B:
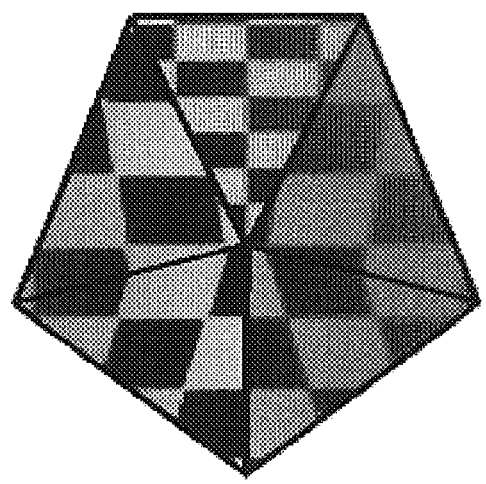
Figure 2A:
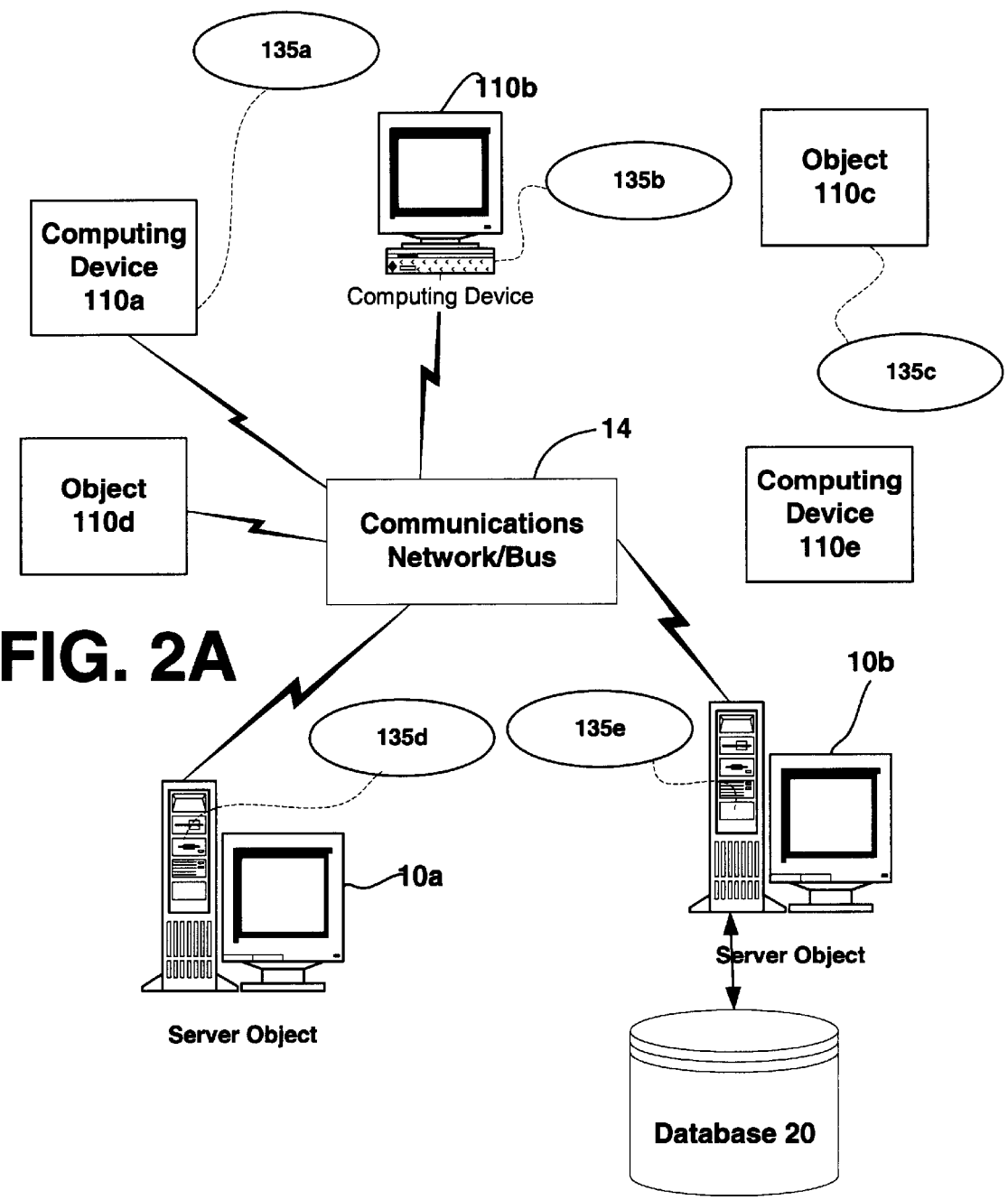
FIG. 2A is a block diagram representing an exemplary network environment having a variety of computing devices in which the present invention may be implemented.

FIG. 2A provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, televisions, MP3 players, televisions, personal computers, etc. Each object can communicate with another object by way of the communications network 14. This network may itself comprise other computing objects and computing devices that provide services to the system of FIG. 2A. In accordance with an aspect of the invention, each object 10 or 110 may contain an application that might request parametrization services.

In a distributed computing architecture, computers, which may have traditionally been used solely as clients, communicate directly among themselves and can act as both clients and servers, assuming whatever role is most efficient for the network. This reduces the load on servers and allows all of the clients to access resources available on other clients, thereby increasing the capability and efficiency of the entire network. Parametrization services in accordance with the present invention may thus be distributed among clients and servers, acting in a way that is efficient for the entire network.

Distributed computing can help businesses deliver services and capabilities more efficiently across diverse geographic boundaries. Moreover, distributed computing can move data closer to the point where data is consumed acting as a network caching mechanism. Distributed computing also allows computing networks to dynamically work together using intelligent agents. Agents reside on peer computers and communicate various kinds of information back and forth. Agents may also initiate tasks on behalf of other peer systems. For instance, intelligent agents can be used to prioritize tasks on a network, change traffic flow, search for files locally or determine anomalous behavior such as a virus and stop it before it affects the network. All sorts of other services may be contemplated as well. Since graphical object(s) may in practice be physically located in one or more locations, the ability to distribute parametrization services is of great utility in such a system.

It can also be appreciated that an object, such as 110c, may be hosted on another computing device 10 or 110. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wireline or wireless systems, by local networks or widely distributed networks. Currently, many of the networks are coupled to the Internet, which provides the infrastructure for widely distributed computing and encompasses many different networks.

In home networking environments, there are at least four disparate network transport media that may each support a unique protocol such as Power line, data (both wireless and wired), voice (e.g., telephone) and entertainment media. Most home control devices such as light switches and appliances may use power line for connectivity. Data Services may enter the home as broadband (e.g., either DSL or Cable modem) and are accessible within the home using either wireless (e.g., HomeRF or 802.11b) or wired (e.g., Home PNA, Cat 5, even power line) connectivity. Voice traffic may enter the home either as wired (e.g., Cat 3) or wireless (e.g., cell phones) and may be distributed within the home using Cat 3 wiring. Entertainment media may enter the home either through satellite or cable and is typically distributed in the home using coaxial cable. IEEE 1394 and DVI are also emerging as digital interconnects for clusters of media devices. All of these network environments and others that may emerge as protocol standards may be interconnected to form an intranet that may be connected to the outside world by way of the Internet. In short, a variety of disparate sources exist for the storage and transmission of data, and consequently, moving forward, computing devices will require ways of sharing data, such as data accessed or utilized incident to the parametrization of graphics object(s) in connection with the present invention.

The Internet commonly refers to the collection of networks and gateways that utilize the TCP/IP suite of protocols, which are well-known in the art of computer networking. TCP/IP is an acronym for "Transport Control Protocol/Interface Program." The Internet can be described as a system of geographically distributed remote computer networks interconnected by computers executing networking protocols that allow users to interact and share information over the networks. Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer e.g., a server. In the example of FIG. 2A, computers 110a, 110b, etc. can be thought of as clients and computer 10a, 10b, etc. can be thought of as the server where server 10a, 10b, etc. maintains the data that is then replicated in the client computers 110a, 110b, etc.

A server is typically a remote computer system accessible over a remote network such as the Internet. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by a protocol layer. For example, Hypertext-Transfer Protocol (HTTP) is a common protocol that is used in conjunction with the World Wide Web (WWW). Typically, a computer network address such as a Universal Resource Locator (URL) or an Internet Protocol (IP) address is used to identify the server or client computers to each other. The network address can be referred to as a URL address. For example, communication can be provided over a communications medium. In particular, the client and server may be coupled to one another via TCP/IP connections for high-capacity communication.

Thus, FIG. 2A illustrates an exemplary networked or distributed environment, with a server in communication with client computers via a network/bus, in which the present invention may be employed. In more detail, a number of servers 10a, 10b, etc., are interconnected via a communications network/bus 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to process graphical object(s).

In a network environment in which the communications network/bus 14 is the Internet, for example, the servers 10 can be Web servers with which the clients 110a, 110b, 110c, 110d, 110e, etc. communicate via any of a number of known protocols such as HTTP. Servers 10 may also serve as clients 110, as may be characteristic of a distributed computing environment. Communications may be wired or wireless, where appropriate. Client devices 110 may or may not communicate via communications network/bus 14, and may have independent communications associated therewith. For example, in the case of a TV or VCR, there may or may not be a networked aspect to the control thereof. Each client computer 110 and server computer 10 may be equipped with various application program modules or objects 135 and with connections or access to various types of storage elements or objects, across which files may be stored or to which portion(s) of files may be downloaded or migrated. Any computer 10a, 10b, 110a, 110b, etc. may be responsible for the maintenance and updating of a database 20 or other storage element in accordance with the present invention, such as a database or memory 20 for storing graphics object(s) or intermediate graphics object(s) processed according to the invention. Thus, the present invention can be utilized in a computer network environment having client computers 110a, 110b, etc. that can access and interact with a computer network/bus 14 and server computers 10a, 10b, etc. that may interact with client computers 110a, 110b, etc. and other devices 111 and databases 20.

Exemplary Computing Device

Figure 2B:
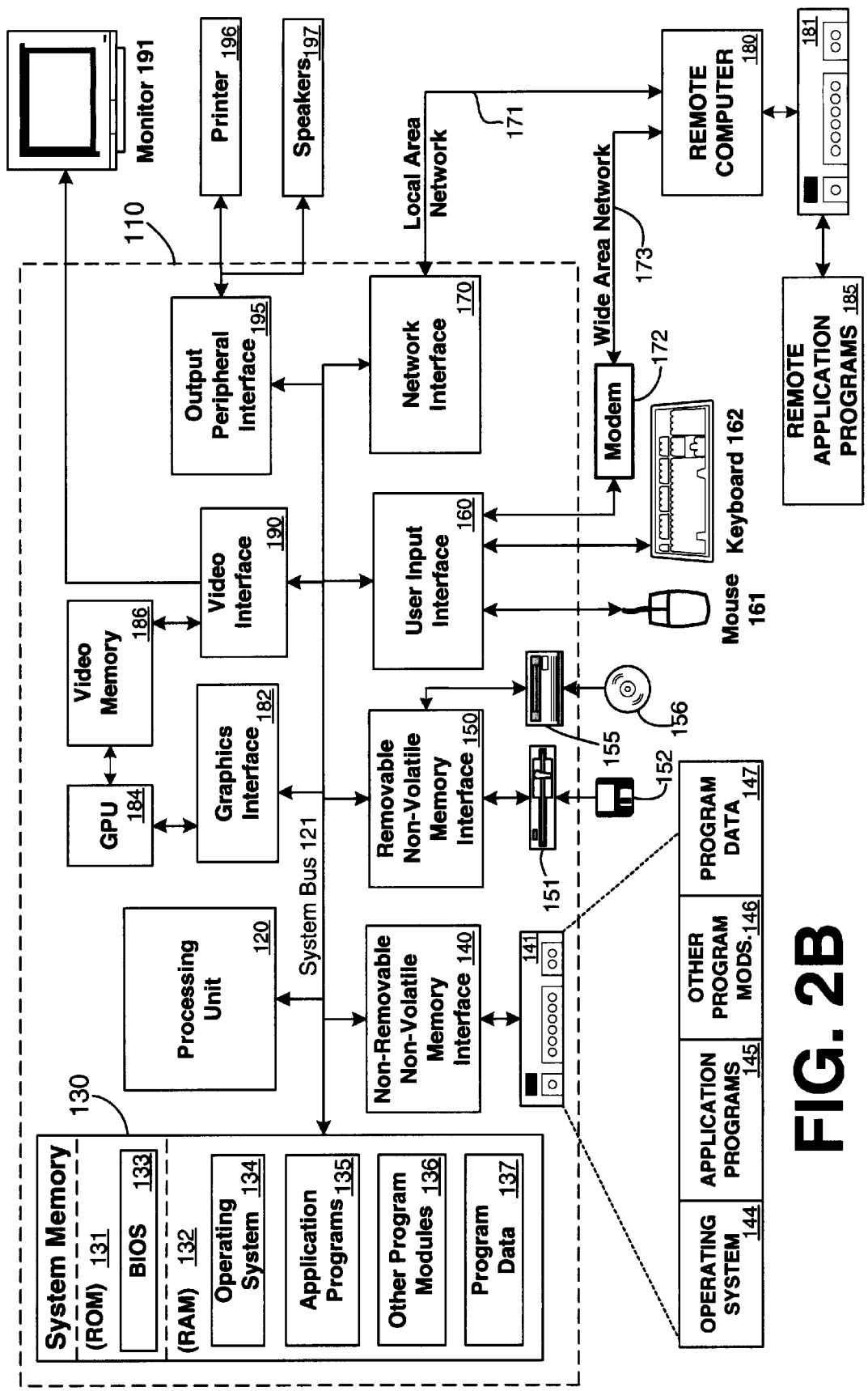
FIG. 2B is a block diagram representing an exemplary non-limiting computing device in which the present invention may be implemented.

FIG. 2B and the following discussion are intended to provide a brief general description of a suitable computing environment in which the invention may be implemented. It should be understood, however, that handheld, portable and other computing devices and computing objects of all kinds are contemplated for use in connection with the present invention. While a general purpose computer is described below, this is but one example, and the present invention may be implemented with a thin client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved is a desirable, or suitable, environment for operation of the parametrization techniques of the invention.

Although not required, the invention can be implemented via an operating system, for use by a developer of services for a device or object, and/or included within application software that operates in connection with the parametrization of graphics object(s). Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. The invention may also be practiced in distributed computing environments where tasks are performed by remote processing devices that are linked through a communications network/bus or other data transmission medium. In a distributed computing environment, program modules may be located in both local and remote computer storage media including memory storage devices, and client nodes may in turn behave as server nodes.

FIG. 2B thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 2B, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated-data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2B illustrates operating system 134, application programs 135, other program modules 136, and program data 137.

The computer 110 may also include other removable/non-removable, volatile/nonvolatile computer storage media. By way of example only, FIG. 2B illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2B provide storage of computer readable instructions, data structures, program modules and other data for the computer 110. In FIG. 2B, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2B. The logical connections depicted in FIG. 2B include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2B illustrates remote application programs 185 as residing on memory device 181. It will be appreciated that the network connections shown are exemplary and other means of establishing a communications link between the computers may be used.

Exemplary Distributed Computing Frameworks or Architectures

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s .NET platform includes servers, building-block services, such as Web-based data storage and downloadable device software. Generally speaking, the NET platform provides (1) the ability to make the entire range of computing devices work together and to have user information automatically updated and synchronized on all of them, (2) increased interactive capability for Web sites, enabled by greater use of XML rather than HTML, (3) online services that feature customized access and delivery of products and services to the user from a central starting point for the management of various applications, such as e-mail, for example, or software, such as Office NET, (4) centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors and (7) many other cross-platform integration features as well.

While exemplary embodiments herein are described in connection with software residing on a computing device, one or more portions of the invention may also be implemented via an operating system, application programming interface (API) or a "middle man" object between a coprocessor and requesting object, such that parametrization services may be performed by, supported in or accessed via all of NET's languages and services, and in other distributed computing frameworks as well.

Optimizing Geometric Stretch to Create Balanced Parametrization

The present invention relates to the optimization of geometric stretch in connection with a parametrization process. Given an arbitrary mesh, the systems and methods of the invention construct a progressive mesh (PM) such that all meshes in the PM sequence share a common texture parametrization. The systems and methods minimize geometric stretch, i.e., small texture distances mapped onto large surface distances, to balance sampling rates over all locations and directions on the surface. The systems and methods also minimize texture deviation, i.e., "slippage" error based on parametric correspondence, to obtain accurate textured mesh approximations. The technique(s) begin by partitioning the mesh into charts using planarity and compactness heuristics. Then, the technique(s) proceed by creating a stretch-minimizing parametrization within each chart, and by resizing the charts based on the resulting stretch. Then, the technique(s) simplify the mesh while respecting the chart boundaries. Next, the parametrization is re-optimized to reduce both stretch and deviation over the whole PM sequence. The charts may then be packed into a texture atlas for improved texture mapping in connection with a parametrization scheme.

To allow all meshes in the PM to share a common texture map, the present invention creates domains with straight boundaries between chart corners. In accordance with the optimization of the present invention, two relevant processes for texture mapping PMs are optimized: geometric stretch and texture deviation. In this regard, geometric stretch and texture deviation are minimized. The stretch metric utilized in accordance with the invention balances sampling rates everywhere on the surface, unlike previous techniques, thus proving to be an effective general solution when nothing is known in advance about the signal, or object, being parametrized.

As intimated in the background, the invention addresses the following problem: given an arbitrary mesh, parametrize it onto a texture atlas, and create a PM sequence compliant with the atlas charts, while minimizing geometric stretch and texture deviation.

With respect to minimizing geometric stretch, the parametrization determines sampling density over the surface, but is constructed before knowing what texture map(s) will be applied. Therefore, the invention provides a balanced parametrization rather than one that samples finely in some surface regions or directions while undersampling others. This is what is referred to herein as minimizing "geometric stretch." A conservative, local measure of how finely the parametrization samples the texture signal is the larger singular value of its Jacobian, which measures how much a sampling direction in the texture domain is stretched on the mesh surface in the worst case. By minimizing the largest geometric stretch across all domain points, the invention creates a balanced parametrization where no domain direction is too stretched and thus undersamples its corresponding mapped 3D direction. As will become apparent, FIGS. 3F, 3G, 11C and 11D show the minimization of geometric stretch in accordance with the invention compared to FIGS. 3A through 3E and FIGS. 11A and 11B.

With respect to minimizing texture deviation, traditional mesh simplification techniques measure geometric error by approximating closest-point distance. For textured surfaces, however, it is more appropriate to use the stricter texture deviation error, which measures geometric error according to parametric correspondence. For a PM, texture deviation can be graphed as a function of mesh complexity, as shown in FIG. 8B. As shown by the graph, the invention lowers this graph curve.

While the motivation for partitioning the surface into charts is to reduce geometric stretch, the presence of chart boundaries hinders simplification quality since chart-compliance requires that these boundaries appear as edges in all meshes including $M^0$. In the extreme, if each face of $M^n$ is made its own chart, stretch is zero, but no simplification can occur. Hence, there exists a trade-off between geometric stretch and deviation.

Minimizing stretch and deviation is a difficult nonlinear problem over both discrete and continuous variables. The discrete variables are the mesh partition and the edge collapse sequence. The continuous variables are the texture coordinates of the vertices. The techniques of the invention in various embodiments set the discrete variables early, using heuristics, and then proceed to optimize the continuous variables. In one embodiment, the method includes the following steps: (1) partition the original mesh into charts (considering geometry), (2) form initial chart parametrizations (minimizing stretch), (3) resize the chart polygons (based on stretch), (4) simplify the mesh (minimizing texture deviation, creating PM), (5) optimize the parametrization (stretch & deviation over all PM), (6) pack the chart polygons (forming texture atlas) and (7) sample the texture images (using atlas parametrization).

The present invention defines a new geometric stretch metric. To optimize the ability of a parametrization to balance frequency content everywhere over the surface in every direction, the "geometric stretch" metric on triangle meshes is as follows:

Given a triangle T with 2D texture coordinates $p_1, p_2, p_3$, $p_i=(s_i, t_i)$, and corresponding 3D coordinates $q_1, q_2, q_3$, the unique affine mapping $S(p)=S(s,t)=q$ is:

$$S(p)=(<p,p_2,p_3>q_1+<p,p_3,p_1>q_2+<p,p_1,p_2>q_3)/<p_1,p_2,p_3>$$

where <a,b,c> denotes area of triangle abc. Since the mapping is affine, its partial derivatives are constant over (s,t) and are given by:

$$S_s = \partial S/\partial s = (q_1(t_2-t_3)+q_2(t_3-t_1)+q_3(t_1-t_2))/(2A)$$

$$S_t = \partial S/\partial t = (q_1(s_3-s_2)+q_2(s_1-s_3)+q_3(s_2-s_1))/(2A)$$

$$A = <p_1,p_2,p_3> = ((s_2-s_1)(t_3-t_1)-(s_3-s_1)(t_2-t_1))/2$$

The larger and smaller singular values of the Jacobian $[S_s, S_t]$ are given respectively by:

$$\Gamma = \sqrt{1/2\left((a+c) + \sqrt{(a-c)^2 + 4b^2}\right)} \quad \text{max singular value}$$

$$\gamma = \sqrt{1/2\left((a+c) - \sqrt{(a-c)^2 + 4b^2}\right)} \quad \text{min singular value}$$

where $a = S_s \cdot S_s$, $b = S_s \cdot S_t$, and $c = S_t \cdot S_t$. The singular values $\Gamma$ and $\gamma$ represent the largest and smallest length obtained when mapping unit-length vectors from the texture domain to the surface, i.e. the largest and smallest local "stretch". Thus, in accordance with the invention, two stretch norms are defined over triangle T:

$$L^2(T) = \sqrt{(\Gamma^2+\gamma^2)/2} = \sqrt{(a+c)/2}, \quad L^\infty(T) = \Gamma.$$

The norm $L^2(T)$ corresponds to the root-mean-square stretch over all directions in the domain, and the worst-case norm $L^\infty(T)$ is the greatest stretch, i.e., the maximum singular value. It is noted that both $L^2(T)$ and $L^\infty(T)$ increase to infinity as the parametrization of T becomes degenerate, since its parametric area A drops to zero. If the triangle T flips parametrically, i.e., if A becomes negative, then both $L^2(T)$ and $L^\infty(T)$ are defined to remain infinite.

In addition, two analogous norms over the surface of the entire mesh $M = \{T_i\}$ are defined:

$$L^2(M) = \sqrt{\sum_{T_i \in M} (L^2(T_i))^2 A'(T_i) \Big/ \sum_{T_i \in M} A'(T_i)}$$

$$L^\infty(M) = \max_{T_i \in M} L^\infty(T_i)$$

where $A'(T_i)$ is the surface area of triangle $T_i$ in 3D. The $L^2$ norm measures the overall ability of the parametrization to support high-frequency textures, while $L^\infty$ measures its worst-case ability. The stretch values are normalized by scaling the texture domain so that its area equals the surface area in 3D. Thus, 1.0 is a lower bound for either norm on any parametrization. Alternately, stretch can be normalized without explicitly scaling the texture domain by multiplying with the factor:

$$\sqrt{\sum_{T_i \in M} A(T_i) \Big/ \sum_{T_i \in M} A'(T_i)}.$$

To minimize the nonlinear metrics $L^2(M)$ and $L^\infty(M)$, a uniform-edge-spring solution begins the process, and then several optimization iterations are performed. Within each iteration, vertices are considered in decreasing order of neighborhood stretch. For each vertex, a line search minimization is performed along a randomly chosen search direction in the (s,t) parametric domain. Since the other vertices are held fixed, the stretch metric only needs local computation over the neighborhood. Since the metric is infinite for degenerate or flipped triangles, the line search is naturally constrained within the kernel of the vertex's neighborhood. In successive iterations, the convergence tolerance is gradually decreased in the 1D line search using the schedule 1/i where i is the iteration number. For the $L^\infty$ optimization, better results are obtained by using our $L^2$ solution as its starting point.

Figure 3A:
Figure 3A:
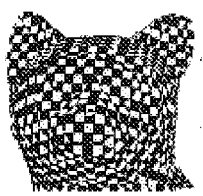
Figure 3A:
Figure 3F:
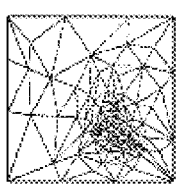
Figure 3F:
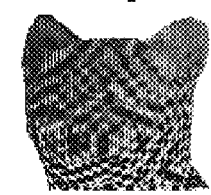
Figure 3F:
Figure 3F:
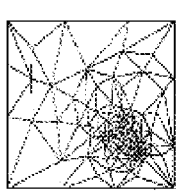
Figure 3F:
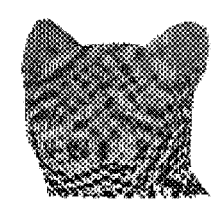
Figure 3F:
Figure 3F:
Figure 3F:
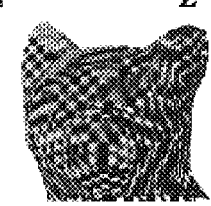
Figure 3F:
Figure 3F:
Figure 3F:
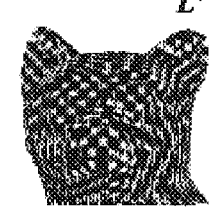
Figure 3F:
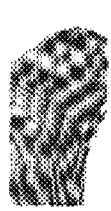
Figure 3F:
Figure 3F:
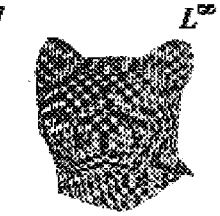
Figure 3F:
Figure 3G:
Figure 3G:
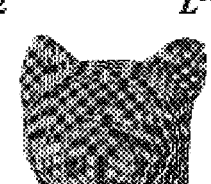
Figure 3G:

FIGS. 3B through 3G compare the metric of the present invention (FIGS. 3F and 3G) with alternatives (FIGS. 3B through 3E) found in the prior art. FIG. 3A illustrates an exact reproduction of the image upon which the techniques of FIGS. 3B to 3G operate. FIG. 3B illustrates the operation of the Floater technique described in the background on FIG. 3A. FIG. 3C illustrates the operation of the Hormann and Greiner technique described in the background on FIG. 3A. FIG. 3D illustrates the operation of the Maillot et al. technique described in the background on FIG. 3D. FIG. 3E illustrates the operation of the Cohen et al. technique described in the background on FIG. 3A. For each metric, the optimization procedure described above was utilized. Thus, in each of FIGS. 3B to 3G, boundary vertices were fixed by arc-length. For each parametrization, a 128×128 image was created in the texture domain by sampling a procedural 3D checkered pattern on the parametrized surface. For improved filtering, 4×4 supersampling was used. As can be seen in the resulting textured models, parametrizations optimized using the metrics of the invention are better at capturing high-frequency detail everywhere over the surface. In FIGS. 3B to 3D, there is a loss of resolution on the ears of the cat where stretch error is high. For FIG. 3D, the factor $\alpha$ is set weighting between edge-springs and area-preservation to 0.5. Since the relative scale of 2D to 3D edge lengths is important in this metric, the 2D domain is uniformly scaled to have the same area as the 3D chart. The reported stretch norms of the invention are infinite because the minimum solution exhibits buckling. Since the optimization method of the invention prevents face flipping, the result is parametrically degenerate triangles having infinite stretch. The area-preserving parametrization in FIG. 3E minimizes the buckling term of FIG. 3D only. Although it has better spatial distribution than FIGS. 3B to 3D, it is noted how the resulting images are undersampled in certain directions, causing directional blur on the chin, sides and ears. In turn, the techniques of FIG. 3F and FIG. 3G of the invention yield better results by comparison. FIGS. 3F and 3G illustrate how undersampling is minimized everywhere on the surface in all directions with the invention, measuring how well the parametrization samples the signal all over the surface in all directions.

The PM parametrization scheme in connection with various embodiments of the invention is now described in more detail. First, however, some definitions and assumptions are introduced: Let a chart corner be any vertex adjacent to three or more charts, and let a chart boundary be the path of edges separating charts between two corners. Let the neighborhood of a vertex be defined as the ring of faces adjacent to the vertex.

The PM of the invention is based on the half-edge collapse operation $(v_1, v_2) \rightarrow v_1$ which affects the neighborhood of $v_2$ as shown in FIG. 4B in relation to FIG. 4A and leaves the position and attributes of $v_1$ unchanged. The present invention preferably utilizes the half-edge collapse as opposed to the full-edge collapse to avoid writes to the vertex buffer during runtime LOD changes, although the invention is not so limited. Therefore, (s,t) texture coordinates at any vertex must be the same at all LOD levels. Since a vertex on a chart boundary has different (s,t) coordinates on each chart, these must be stored at the corners of mesh faces.

To create a texture atlas over a PM, the following constraints are enforced in accordance with the present invention: (1) mesh faces cannot span more than one chart, since it is impractical to specify and render disjoint pieces of texture over any single triangle and (2) chart boundaries must be straight in the parametric domain, since each chart boundary is generally simplified to a single edge in the PM base mesh. These constraints restrict the partition of the mesh into charts and the mesh simplification sequence, as described below.

With respect to partitioning meshes into charts, the invention first includes partitioning the mesh into a set of charts, i.e., regions with disk-like topology. Ideally, one could simultaneously search over the discrete space of possible chart decompositions and the continuous space of parametrizations allowed by each decomposition. However, this is not a very practical approach. Instead, the present invention first partitions the mesh using a greedy chart-merging approach that is similar to simplification schemes based on the greedy growth of "superfaces."

In this regard, initially, each face is assigned to be its own chart. For each pair of adjacent charts, the invention considers the operation of merging the two charts into one, and enters this candidate operation into a priority queue according to a computed cost, i.e., the merge operation is assigned a cost that measures both its planarity and compactness. In one embodiment, planarity is measured as the mean-squared distance of the chart to the best-fitting plane through the chart, defined as a continuous surface integral, unlike prior art techniques that evaluate planarity only at the vertices. Compactness is measured simply as the squared perimeter length.

The merge operation is then iteratively applied with lowest cost, and costs of neighboring candidate merge operations are updated. The process ends when the cost exceeds a user-specified threshold.

A chart merge operation is disallowed if it results in any chart with fewer than 3 corners. It is also disallowed if the boundary between the new chart and any adjacent chart consists of more than one connected component, e.g., one isolated vertex and one path of edges. This constraint also guarantees that charts remain homeomorphic to discs.

Once the charts are formed, they define the set of chart corner vertices. Note that these corner vertices in $M^n$ appear as vertices in the base mesh $M^0$ due to the constrained half-edge collapses. Therefore, with the invention, it is desirable that each chart boundary be closely aligned with the straight line segment between its adjacent two corners, so as not to be a limiting factor in the simplification quality. Each boundary is straightened by computing a shortest path over mesh edges, constrained in that there should be no intersection with other chart boundaries. Results of the initial chart partition, and the subsequent boundary straightening are shown in FIG. 5B in relation to FIG. 5A. It is noted that chart boundaries align with important features in the mesh. FIG. 5A shows the initial chart partitions, and the corresponding figures in FIG. 5B show the results of chart boundary optimization.

With respect to forming initial chart parametrizations, once the chart boundaries are defined in $M^n$, the invention creates an initial parametrization of each chart onto a 2D polygon. The 2D polygon boundary is defined to be a convex polygon with vertices on a circle, where the length of each polygon edge is proportional to the arc-length of the corresponding chart boundary in 3D. The polygon is initially scaled to have unit area. Within each chart, the interior vertices are parametrized by minimizing the $L^2(M)$ stretch metric, using the algorithm described above in connection with the geometric stretch metric of the invention. It is noted that boundary vertices could be optimized as well.

With respect to resizing chart polygons, once chart parametrizations on $M^n$ are formed, the invention determines how much relative space each chart should be granted in the texture domain. For each chart, the invention computes $L^2(M^n\text{chart})$, the root mean square (RMS) stretch over the chart, and uses that value to uniformly resize the chart while preserving its shape. Although the relative chart sizes have no effect on simplification described below, they do affect E(PM) in the final PM optimization described below simplification.

With respect to simplifying the mesh, given the initial chart parametrizations, the invention simplifies the mesh to define a PM. During simplification, texture deviation is minimized. In accordance with the invention, edge collapses are selected that minimize texture deviation by using a priority queue. To enforce chart compliance, edge collapse $(v_1, v_2) \to v_1$ in $M^{i+1} \to M^i$ are disallowed if vertex $v_2$ is a chart corner (to preserve corners), or if $v_2$ is on a chart boundary and edge $(v_1, v_2)$ is not on a chart boundary (to preserve boundary straightness). In addition, the creation of parametrically flipped or degenerate triangles is prevented.

Figure 6:
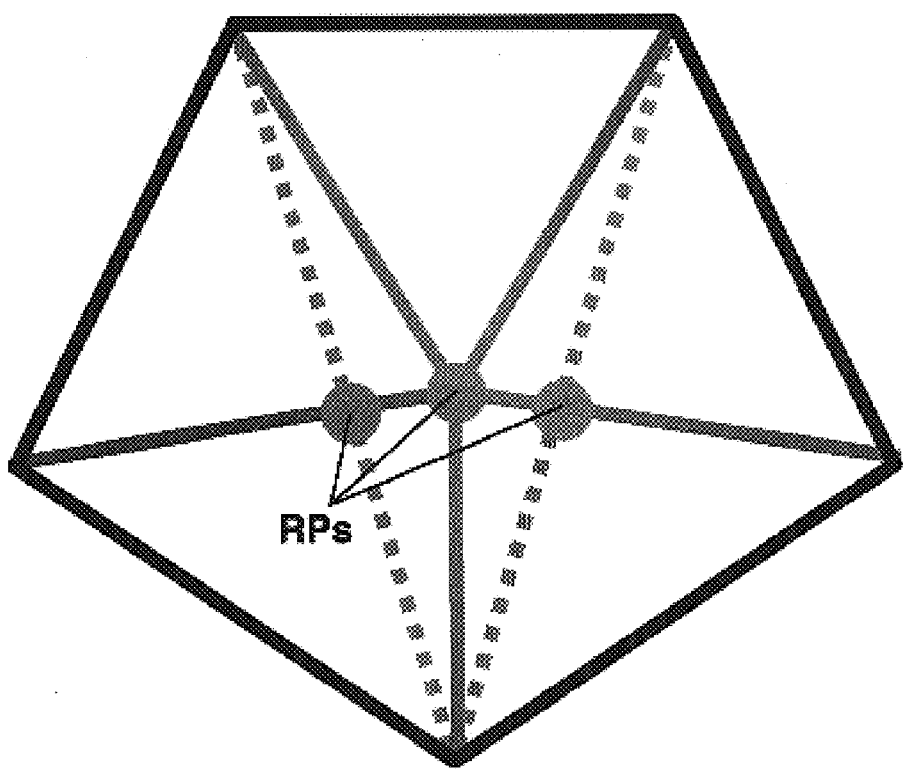
FIG. 6 illustrates exemplary aspects of a maximum deviation point, which may lie at a removed vertex or at an edge-edge intersection point.

To measure texture deviation for each candidate edge collapse, rather than using conservative bounds, the invention measures the incremental texture deviation $d(M^{i+1}, M^i)$ between the two meshes. It is noted that his measurement is based on a heuristic akin to the "memoryless" error that has proven effective for geometric simplification. The maximum deviation between $M^{i+1}$ and $M^i$ is known to lie either at the removed vertex $v_2$ or at an edge-edge intersection point in the parametric neighborhood, e.g., the red points RPs shown in FIG. 6. In this regard, it has empirically shown that the incremental deviation heuristic works well by comparing the heuristic to a slow simplification that orders edge collapses using the true deviation error, i.e., deviation between $M^i$ and $M^n$.

With respect to the optimization of chart parametrizations, having determined the PM simplification sequence, the invention re-optimizes the chart parametrizations to minimize stretch and deviation on the entire sequence $M^0 \ldots M^n$. The nonlinear optimization algorithm utilized in accordance with the invention follows the strategy of moving vertices of $M^n$ one-by-one in the parametric domain as described above in connection with the geometric stretch metric and the formation of initial chart parametrizations, but using a different objective function.

This objective function is a weighted sum of the geometric stretch and deviation on all meshes $M^0 \ldots M^n$ as follows:

$$E(PM) = \Sigma_{i=0,\ldots,n} \psi(i)[\lambda L^2(M^i)^2 + (1-\lambda)d(M^i, M^n)^2/A'(M^n)]$$

where $L^2(M^i)$ is the normalized average stretch of $M^i$ described above computed using the resized charts described above with respect to the resizing of chart polygons, $d(M^i, M^n)$ is its texture deviation, the parameter $0 \leq \lambda \leq 1$ is used to weight stretch error relative to deviation error, and $\psi(i)$ is the relative weight assigned to each LOD mesh in the sequence. Dividing by the mesh surface area $A'(M^n)$ makes the second term scale-invariant like the first term.

A model will now be introduced for setting the relative weight $\psi(i)$ assigned to each mesh $M^i$, consisting of two factors: usage and scale. Depending on the application, other weighting schemes could be used, without changing the optimization method.

In LOD applications, coarser meshes are likely to be used proportionately more often. For example, meshes with 10–100 faces are likely to be used more than those with 900–990 faces. Thus, a reasonable model for usage probability is a uniform distribution over a logarithmic scale of model complexity, e.g., meshes with 10–100 faces are as equally likely as meshes with 100–1000 faces. This distribution is obtained using the factor $1/|M^i|$ where $|M|$ is the number of vertices in M.

The fact that coarser meshes are typically used when the object is farther away reduces the screen-space scale of their deviation and stretch. For a smooth spherical surface, texture deviation varies as $1/|M|^2$. Since LOD algorithms attempt to maintain a constant screen-space error, deviation and, stretch in model space should therefore be down-weighted for coarser meshes using the weighting factor $|M^i|^2$ in $\psi(i)$.

To optimize the texture coordinates of a given vertex v, the optimization algorithm of the invention repeatedly evaluates E. Computing E using the above sum over all meshes would be computationally expensive. Fortunately, the neighborhood of v changes only a few times within the sequence of meshes, generally $O(\log |M^n|)$ times. Thus, the invention considers E only on each refinement neighborhood $M^i \to M^{i+1}$ of which v is a member. For each vertex v, the relevant refinement neighborhoods are gathered as a list during a coarse-to-fine preprocess traversal of the PM.

Since the refinement neighborhoods adjacent to a vertex v have an approximately logarithmic distribution over the PM sequence, we can account for the usage factor by summing the stretch and deviation on these refinement neighborhoods. Therefore, we weight the error over each such neighborhood by $\psi'(i)=|M^i|^2$ to account for the remaining scale factor.

The following pseudo-code is an exemplary and non-limiting implementation of the technique(s) described above:

```
// Optimize parametrization over whole PM sequence.
procedure parametrize_pm( )
    gather_refinement_neighborhoods( ) // coarse-to-fine traversal
    repeat
        v = some_vertex_in_mesh(M^n)
        optimize vertex(v)
    until convergence
// Optimize the parametrization param(v) of vertex v
procedure optimize_vertex(vertex v)
    repeat
        vector dir = random_search_direction( )  // in 2D domain
        // perform line search minimization
        repeat
            select float t       // e.g. using binaiy line search
            param(v) = param(v) + dir * t // perturb parametrization
            of v
        until error_over_PM(v) is minimized
    until convergence
// Sum of errors affected by param(v) in all meshes M^0...M^n.
function error_over_PM(vertex v)
    error = 0
    for (vertex w in refinement_neighborhoods(v))
        error += error_over neighborhood(w, v)
    return error
// Error due to v in neighborhood of w (where w is first introduced)
function error_over_neighborhood(vertex w, vertex v)
    return ψ'level(w))
        [λ * stretch_error(w, original neighbors(w), v) +
        (1-λ) * deviation error(w, original neighbors(w), v) /
        A'(M^n)]
```

As described above in connection with mesh simplification, the invention approximates the deviation error $d(M^i,M^n)$ with the incremental deviation error $d(M^i, M^{i+1})$. Because the stretch metric of the invention is defined to be infinite when a face is flipped in the parameter domain, stretch minimization prevents parametric flipping in all meshes. One further non-limiting detail is that the invention optimizes the parametrization of vertices along chart boundaries. Since these vertices have texture coordinates in two adjacent charts, the invention considers the refinement neighborhoods in both charts simultaneously. Specifically, parametrizations are constrained to remain on the boundaries, and optimizations take place over shared barycentric coordinates along the boundary to prevent "parametric cracks."

With respect to packing chart polygons, since the above-described optimization modifies the parametrization, a final chart resizing step is performed in accordance with the invention.

Thus, the next step is to pack the resized charts into a rectangular texture image. In the context of texture mapping, various heuristics have been presented for the special case of packing 3-sided charts; however, the chart boundaries of the invention advantageously can be arbitrary polygons. In this regard, the general problem is known as the NP-hard pants packing problem.

The problem is simplified by the invention by conservatively approximating each chart polygon with the least-area rectangle that encloses it. This rectangle is found efficiently by considering each edge of the polygon's convex hull. Fortunately, the chart polygons of the invention are reasonably shaped, so the rectangle approximation is not too costly. The chart is rotated to align the long axis of the rectangle with the vertical direction. The problem then becomes that of rectangle packing, which is still NP-hard. The invention provides a simple heuristic for the problem, which works as follows.

Figure 9A:
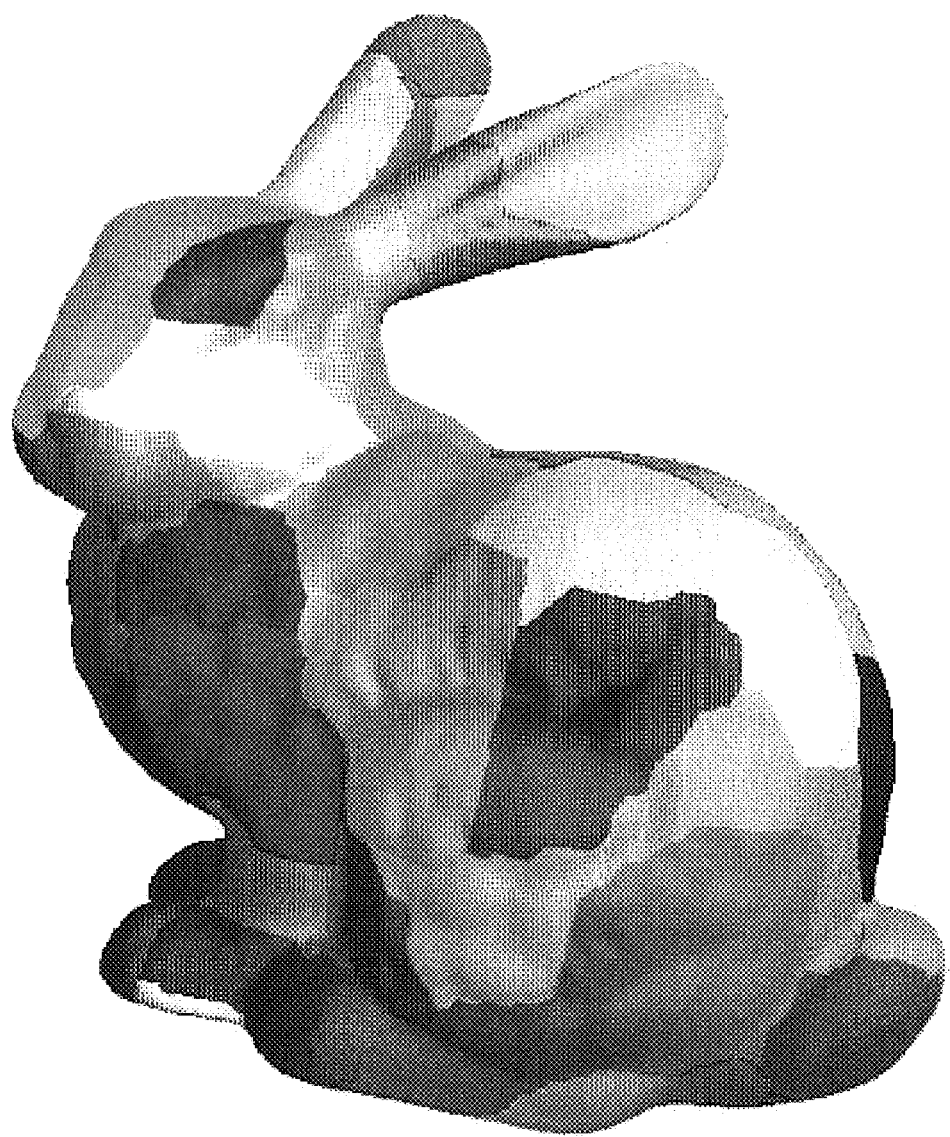
FIGS. 9A to 9D show an overview of the process of the optimization of geometric stretch of a parametrization scheme in accordance with the invention.
Figure 9B:
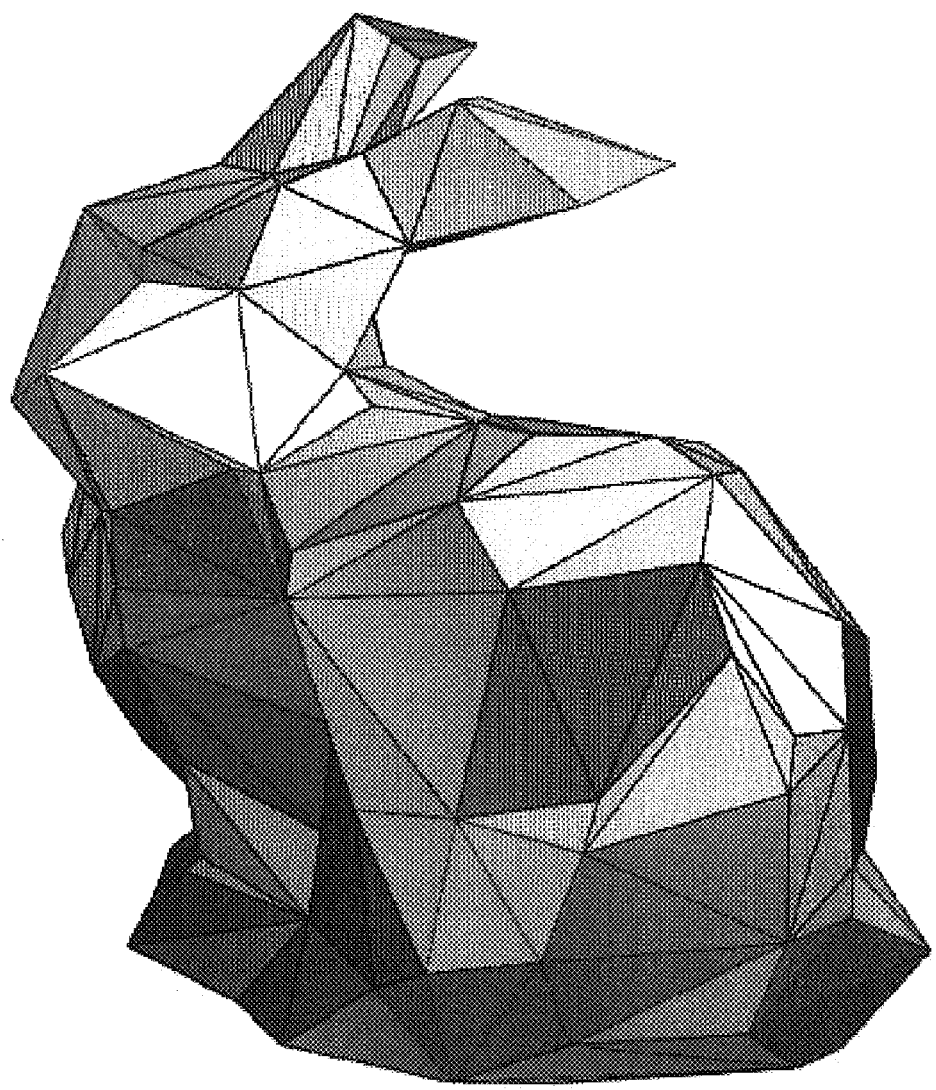
Figure 9C:
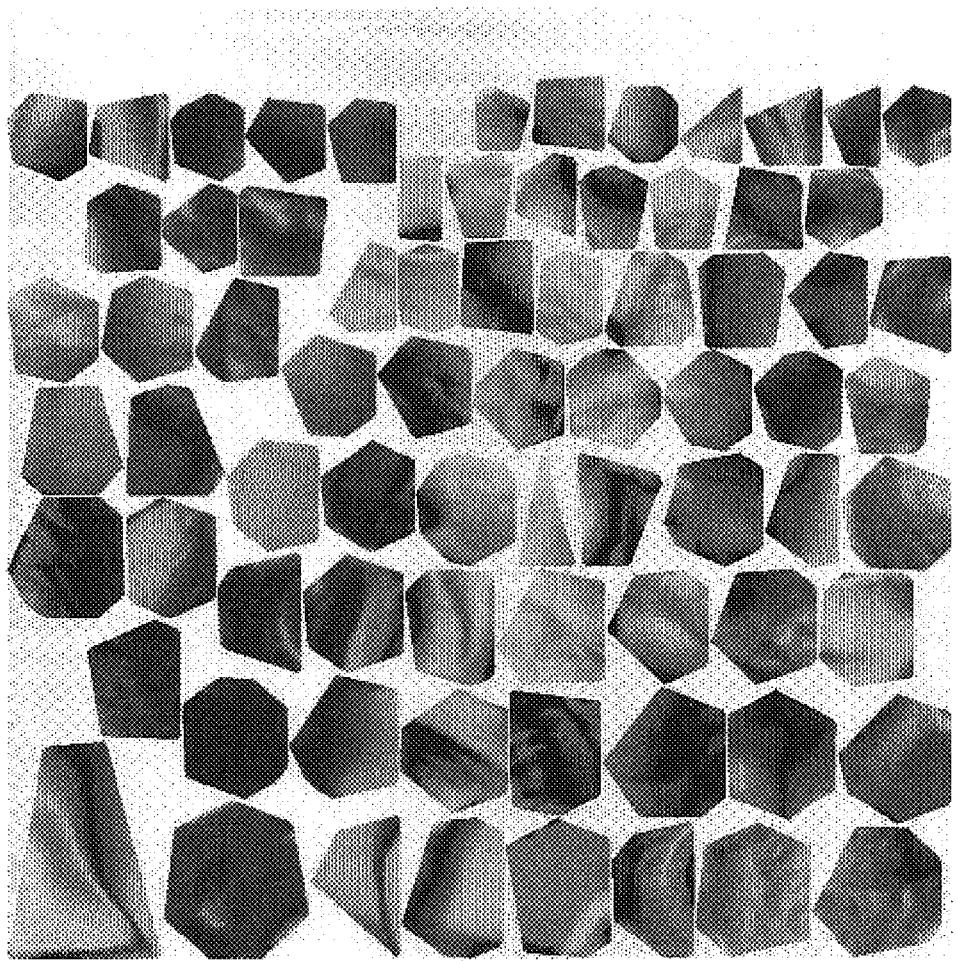
Figure 9D:
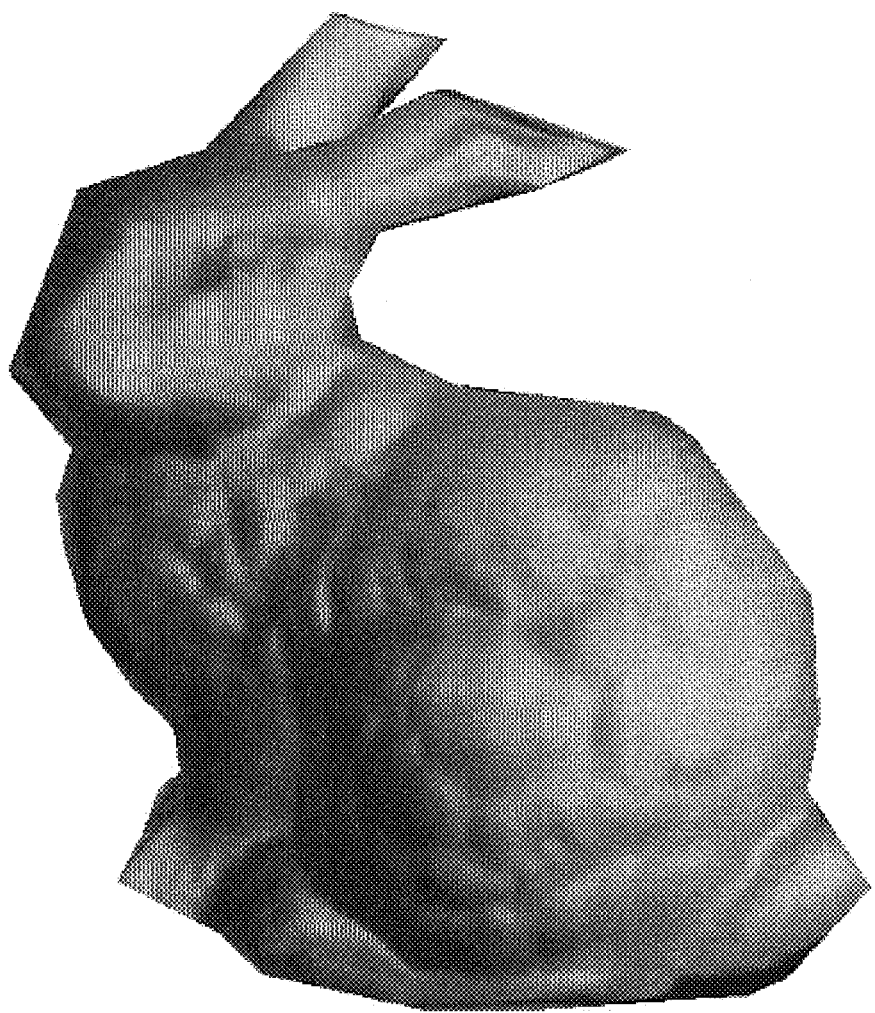
Figure 10A:
FIGS. 10A to 10D show several mesh approximations in a PM sequence, where the texture image captures a normal map.
Figure 10B:
Figure 10C:
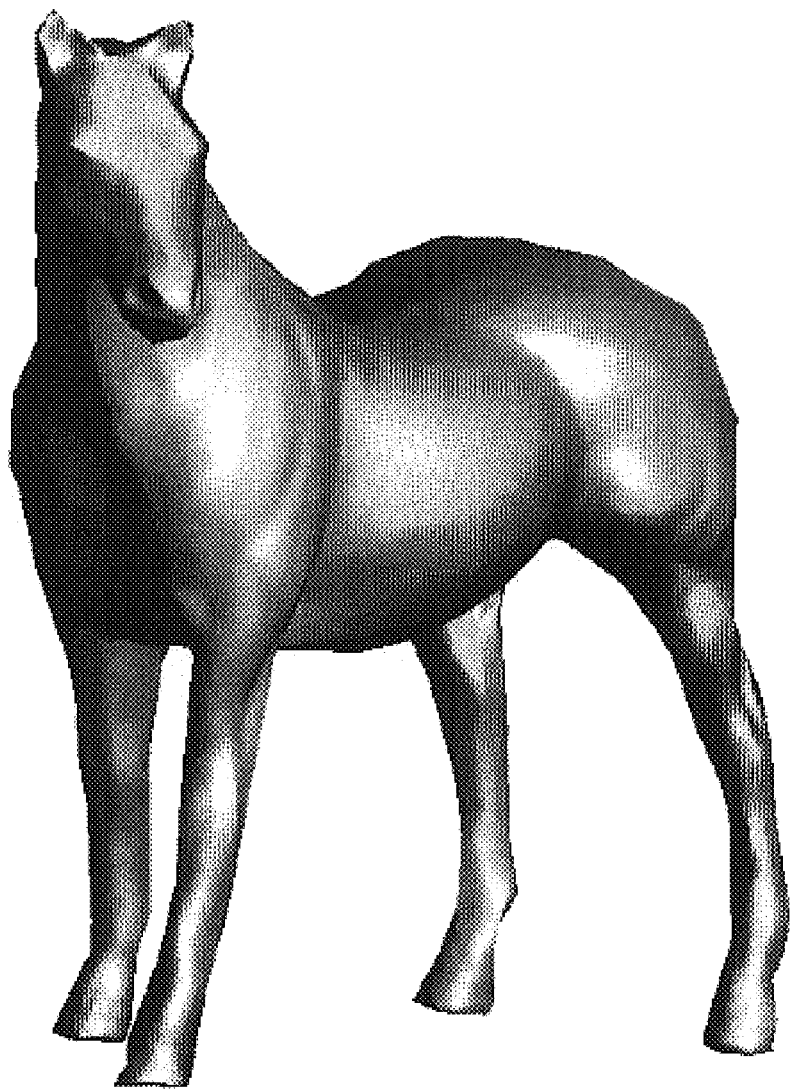
Figure 10D:
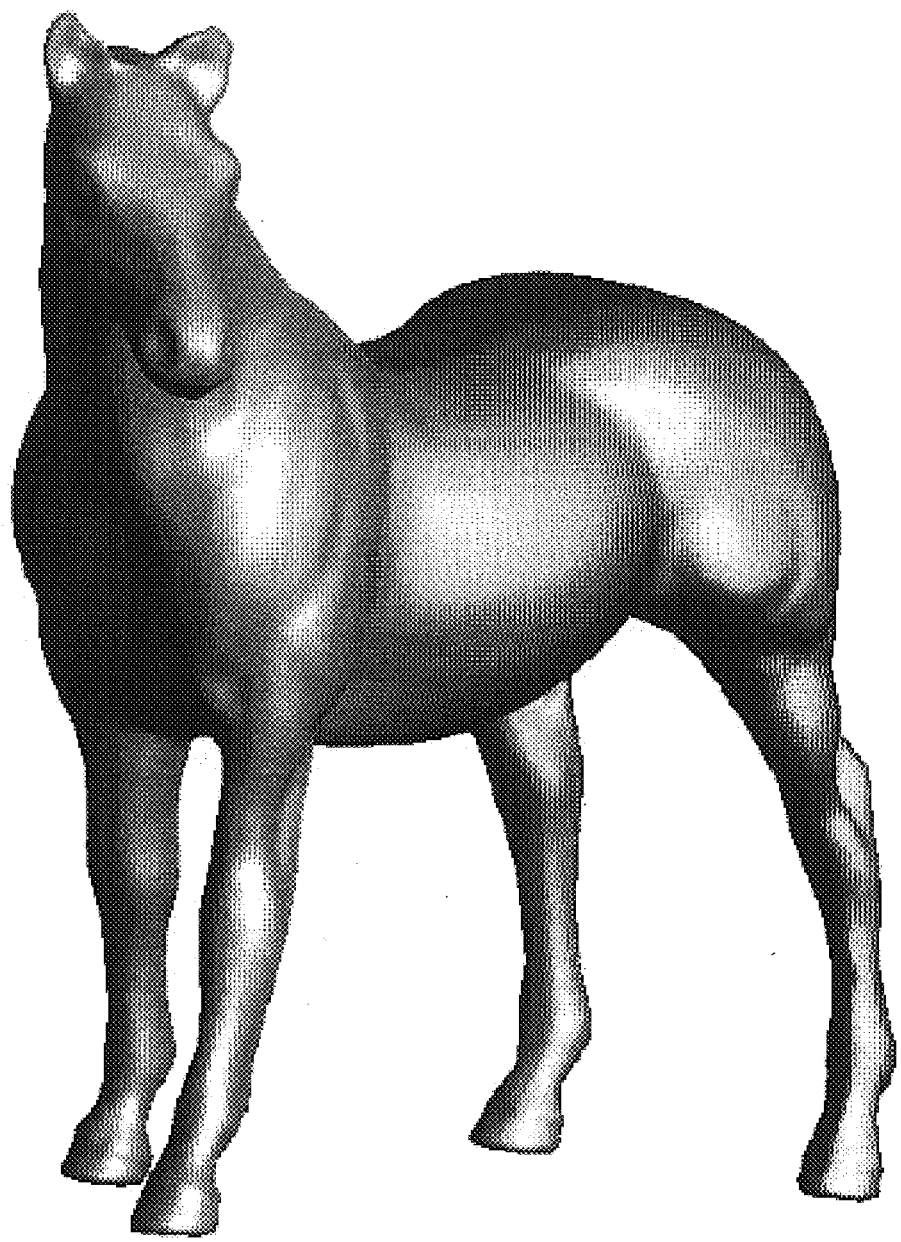
Figure 11A:
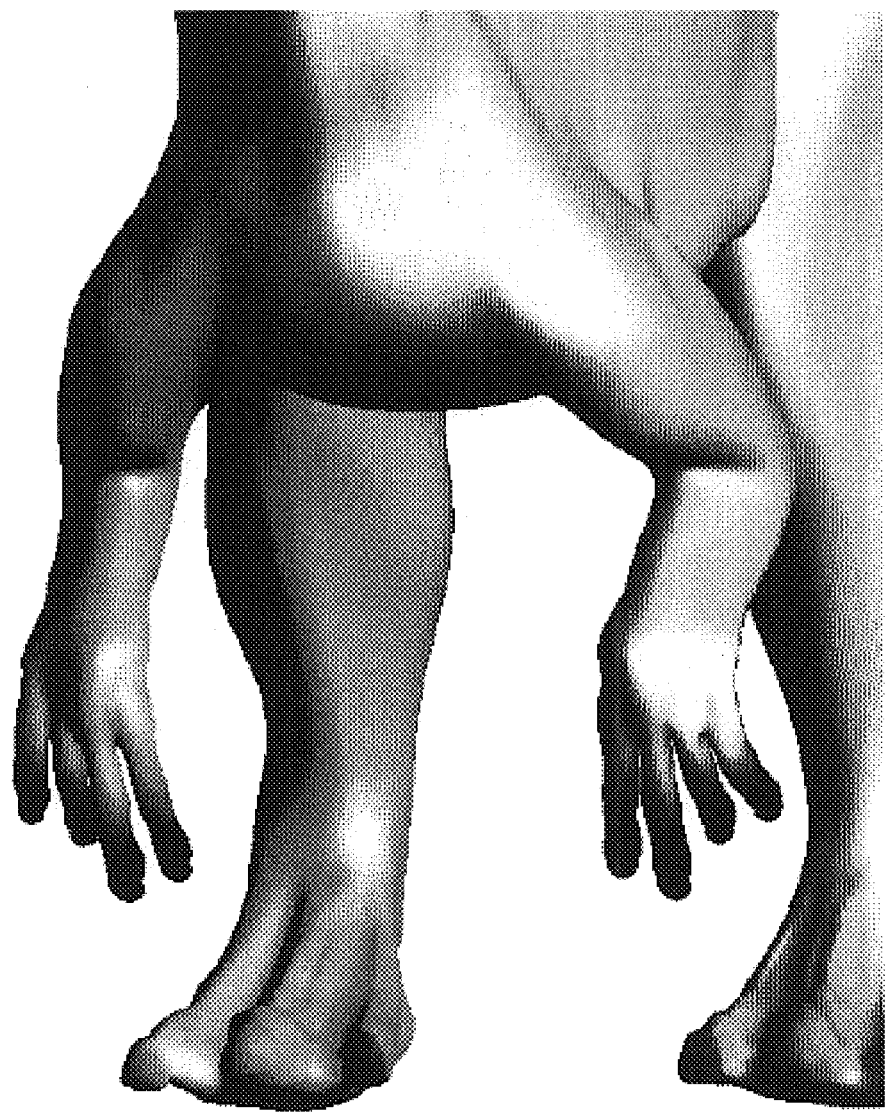
FIGS. 11A to 11D illustrates the advantages of considering geometric stretch during parametrization in accordance with the invention by showing the uniform surface sampling that results therefrom.
Figure 11B:
Figure 11C:
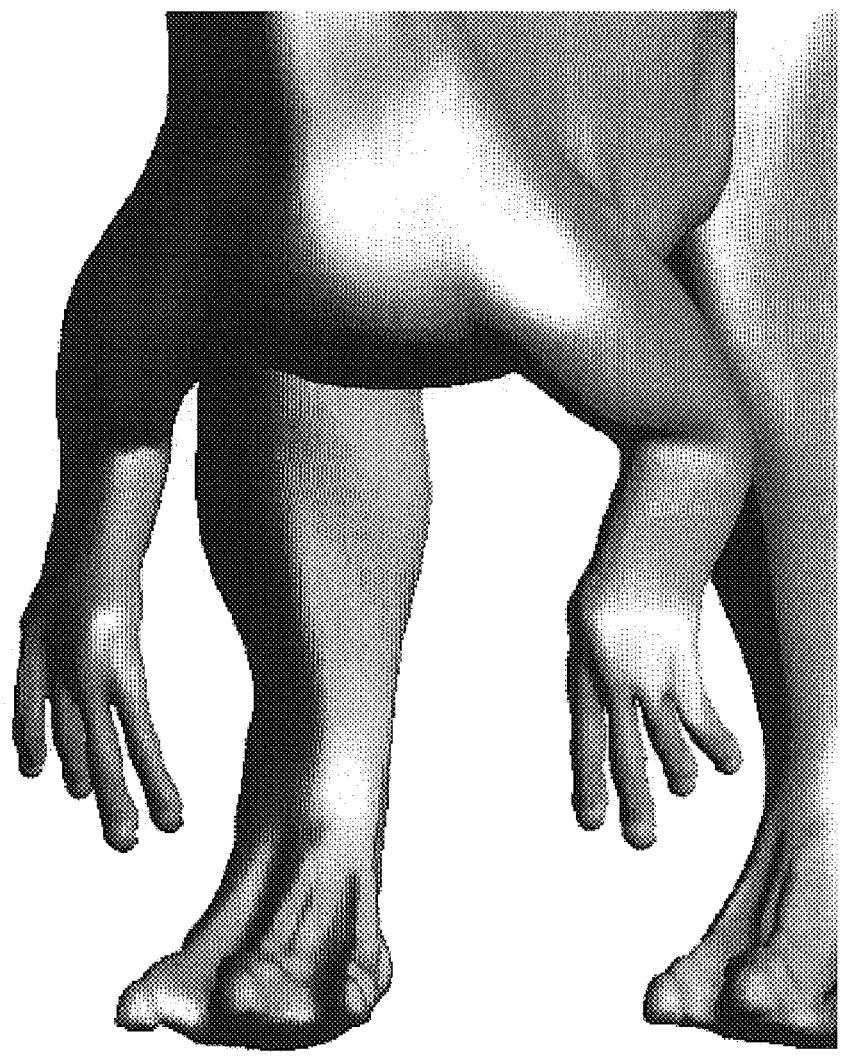
Figure 11D:
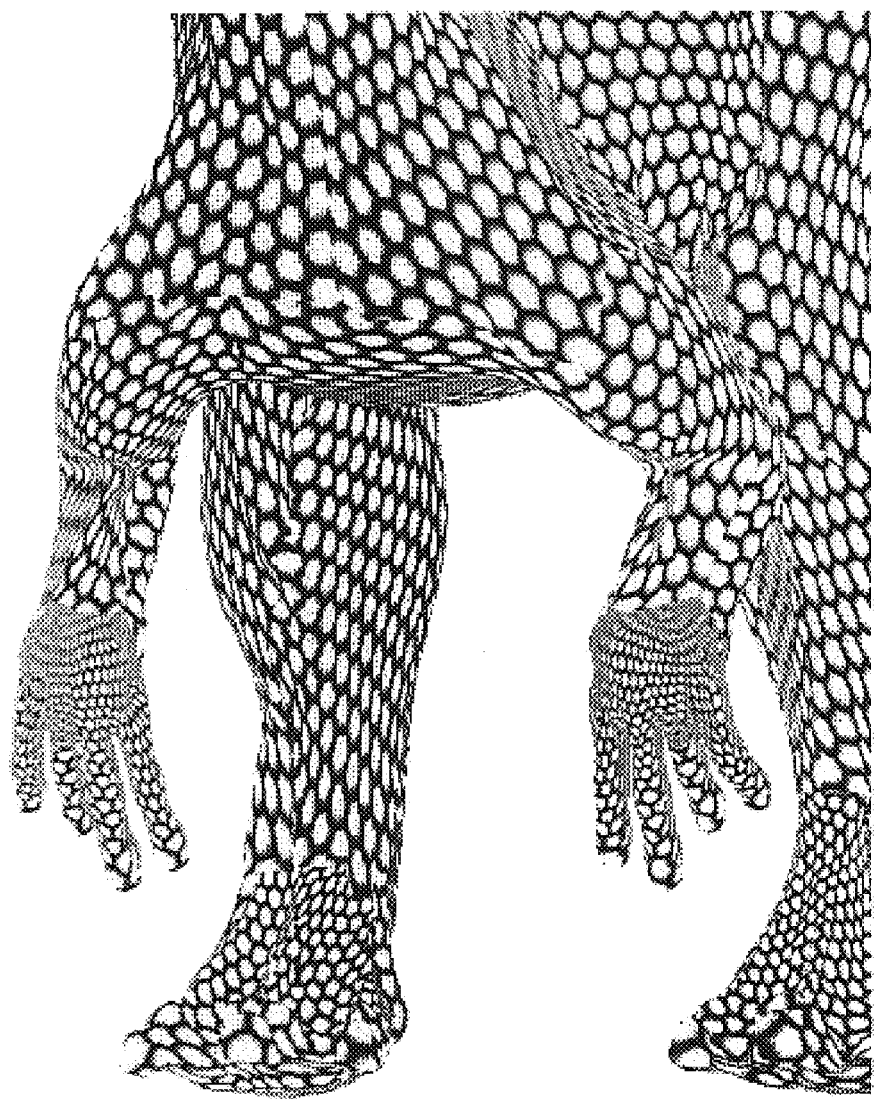

Rectangles are sorted by height. In order of decreasing height, rectangles are placed sequentially into rows in alternating left-to-right and right-to-left order as shown in FIG. 9C. Through binary search, the invention optimizes over the texture width such that the packing minimizes the area of the enclosing square.

When the desired texture sampling density is later determined, a one texel gap is left between adjacent charts. FIGS. 9A through 11D illustrate results of the chart packing efficiency of the invention.

With respect to sampling texture images, the packed charts define a texture atlas for the surface. In accordance with the invention, the atlas is used to sample attributes from the surface $M^n$ into the texture domain, at the 2D grid of texel locations. For improved filtering, the invention super-samples the attributes using a 4×4 box filter. FIGS. 9A through 11D illustrate results of sampling colors and normals.

If the highest frequency f of the attribute function over the surface mesh is known, the stretch-based scale of the texture atlas makes it possible to estimate the required 2D grid sampling density. With the charts resized as described previously herein, the 2D grid spacing should be set no more than $1/(2f)$.

Figure 7:
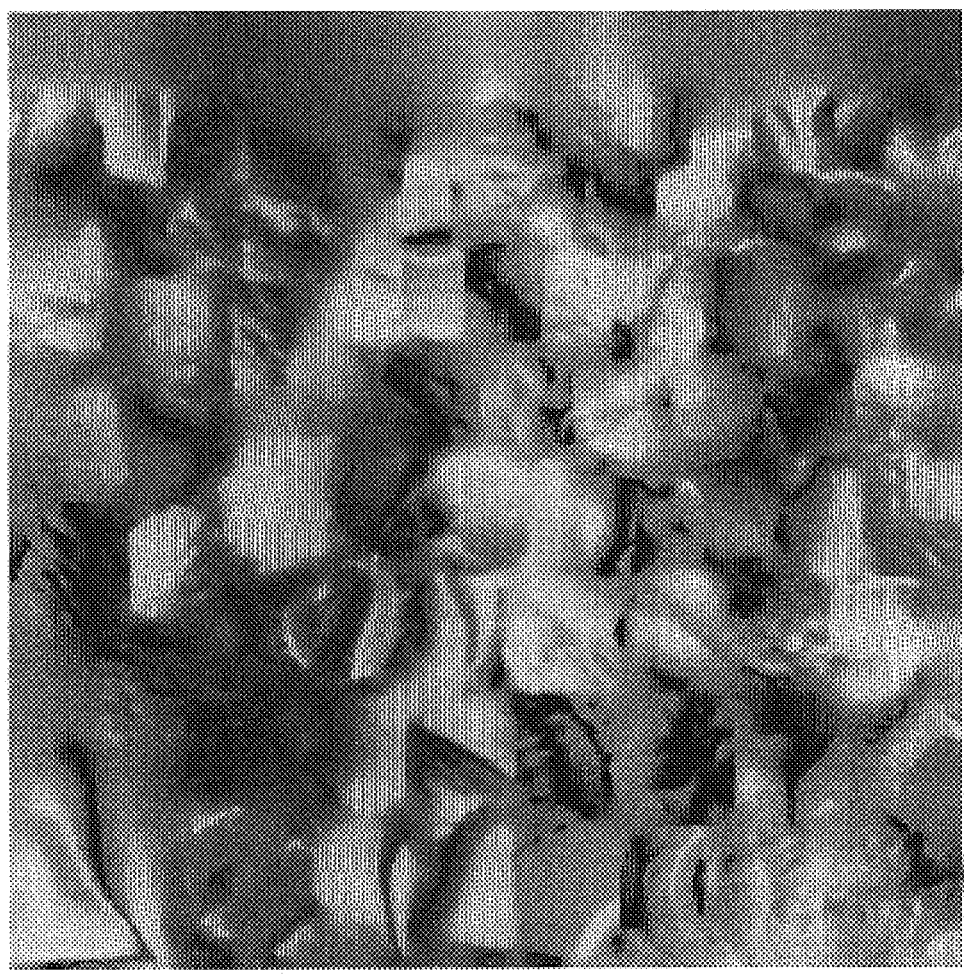
FIG. 7 illustrates the effect of a pull-push algorithm utilized in accordance with the invention on an exemplary atlas image.

In general, schemes that pack multiple charts into a single texture image may give rise to mip-mapping artifacts, since coarser mip-map levels average together spatially disjoint charts. The most immediate artifact is that chart boundaries are revealed if the inter-chart area is left unpainted, e.g., black. To mitigate this, the invention applies a pull-push algorithm to fill in these unsampled regions with reasonable values. As an example, the effect on the atlas image from FIG. 9C is shown in FIG. 7.

Figure 8A:
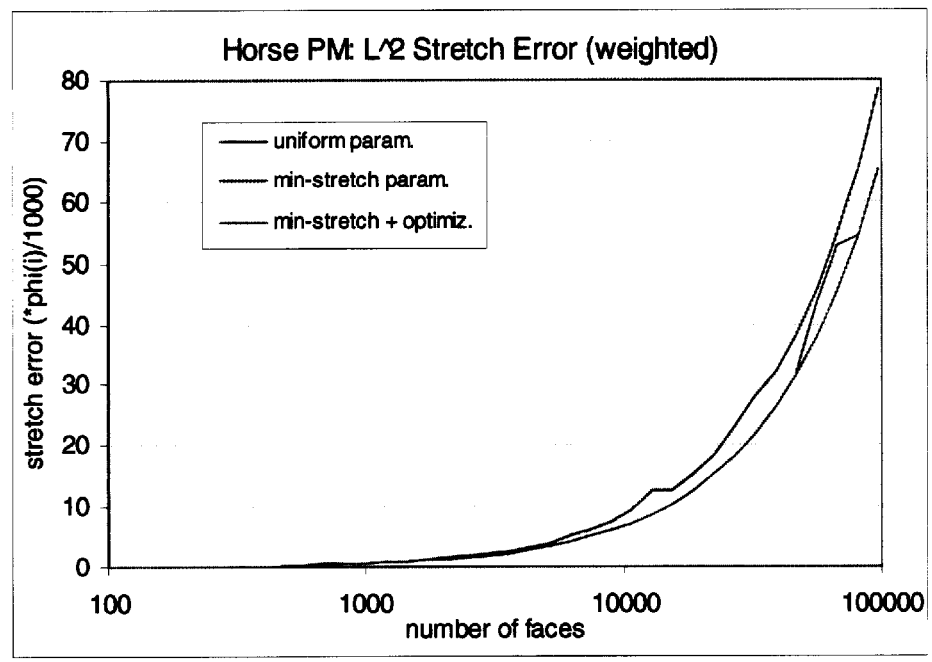
FIGS. 8A and 8B depict error graphs of geometric stretch and deviation over an exemplary PM sequence for various techniques including the techniques of the invention.
Figure 8B:
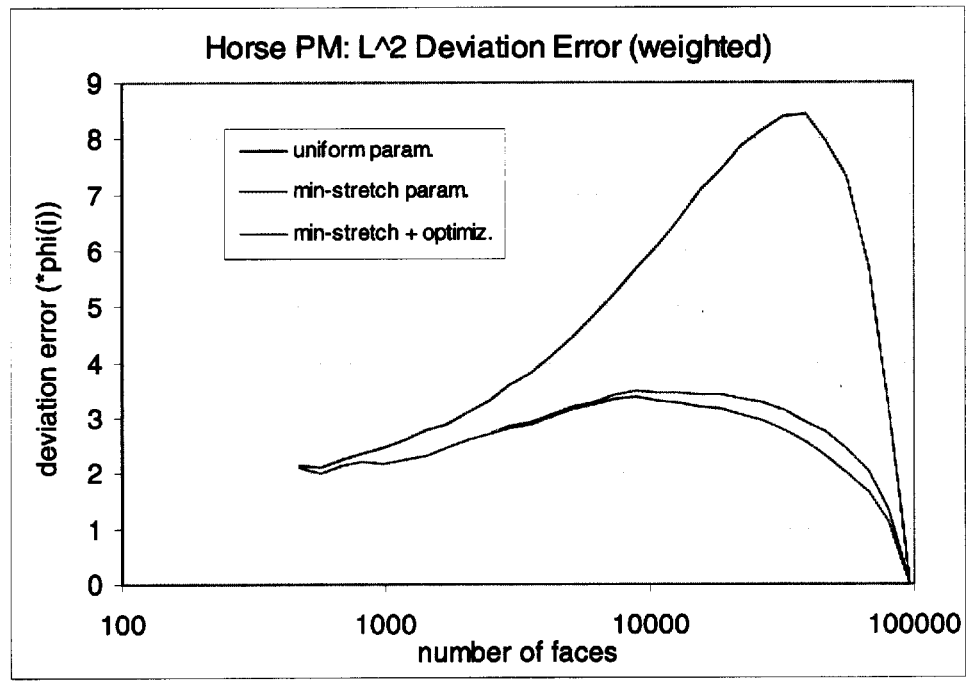

FIGS. 8A and 8B thus compare graphs of geometric stretch and deviation, respectively, for meshes in a PM using various parametrization schemes. The curve labeled "uniform" corresponds to uniform edge-spring parametrization followed by simplification minimizing texture deviation. The curve labeled "min-stretch param." replaces the initial parametrization with the techniques of the invention described above in connection with the section regarding initializing chart parametrizations. As is evident in FIG. 8A, parametric stretch is reduced for the finest mesh $M^n$. It is noted that this difference can often be more significant as shown in Table 1 below. The curve may appear bumpy because stretch is ignored during simplification. Finally, the curve labeled "min-stretch+optimiz." adds the parametrization optimization of the invention described above. It is noted that the invention improves stretch at lower LODs, while also improving texture deviation over the whole range.

As mentioned, results of the various techniques presented herein are presented in FIGS. 9A through 11D. FIGS. 9A to 9D show an overview of the process of the invention. First, the original mesh is partitioned into charts, establishing a stretch-minimizing parametrization on each chart, and then the mesh is simplified while minimizing texture deviation. With the resulting PM sequence $M^0 \ldots M^n$, the parametrization is further optimized to reduce stretch and deviation in all meshes. Finally, the invention packs the charts into an atlas, and fills the atlas with texture samples from $M^n$. FIGS. 9A to 9D illustrate an example result where the texture image captures pre-shaded colors from the original mesh $M^n$. Although only the textured base mesh is shown, the same texture atlas can be used on all other meshes $M^1 \ldots M^n$ in the PM.

FIGS. 10A to 10D show several mesh approximations in a PM sequence, where the texture image captures a normal map. Because the PM meshes can have irregular connectivities, they quickly converge to good geometric approximations. Hence the figure shows LOD meshes with relatively low face-counts, compared to the original mesh of nearly 97,000 faces.

FIGS. 11A to 11D illustrate that ignoring geometric stretch during parametrization results in non-uniform surface sampling, which becomes apparent as loss of detail over regions of high stretch distortion.

Table 1 below provides results on the efficiency of the parametrization in reducing the required texture memory of the bunny of FIGS. 9A to 9D and of the parasaur, horse and hand of FIGS. 5A and 5B. Stretch efficiency is the total surface area in 3D divided by the total chart area in 2D, $\Sigma_T A'(T)/\Sigma_T A(T)$, given that charts are resized as described herein. It is less than unity if some surface regions are sampled more than necessary, i.e., if geometric stretch is not uniform everywhere and in every direction. Packing efficiency is the sum of chart areas in 2D divided by the rectangular texture domain area. It is less than unity due to two factors: the enclosure of chart polygons into rectangles, and the wasted space between the packed rectangles. Texture efficiency is the product of stretch and packing efficiencies, or total surface area divided by texture domain area.

TABLE 1

Quantitative results.

| | Models | | | |
|---|---|---|---|---|
| | bunny | parasaur | horse | hand |
| # faces in $M^n$ | 69,630 | 43,866 | 96,956 | 60,856 |
| # vertices in $M^n$ | 34,817 | 21,935 | 48,480 | 30,430 |
| # charts | 75 | 75 | 120 | 60 |
| # faces in $M^0$ | 288 | 298 | 470 | 230 |

TABLE 1-continued

Quantitative results.

| | Models | | | |
|---|---|---|---|---|
| | bunny | parasaur | horse | hand |
| # vertices in $M^0$ | 146 | 151 | 237 | 117 |
| (stretch efficiency with uniform parametrization) | 0.41 | 0.001 | 0.38 | 0.07 |
| Stretch efficiency | 0.60 | 0.40 | 0.55 | 0.46 |
| intra-rectangle efficiency | 0.77 | 0.71 | 0.77 | 0.76 |
| rectangle-packing effic. | 0.87 | 0.89 | 0.91 | 0.82 |
| Packing efficiency | 0.67 | 0.63 | 0.70 | 0.62 |
| Texture efficiency | 0.40 | 0.25 | 0.38 | 0.29 |

A 1-texel gutter is required between texture charts in the texture domain. The overhead of these gutters depends on the resolution assigned to the texture. The packing efficiencies reported in Table 1 ignore this overhead, and therefore assume a reasonably high sampling rate.

It is noted that stretch efficiency can be improved by partitioning the surface into more charts, but this increases the complexity of the coarsest LOD mesh, and may lower overall texture efficiency due to the additional gutter area. The stretch-minimizing parametrization of the invention allows larger charts with fewer undersampling artifacts.

Thus, the present invention presents a scheme for defining a texture atlas parametrization over the PM representation of an arbitrary mesh. This atlas permits the same texture image(s) to be used for all LOD mesh approximations in the PM sequence. In forming the parametrization, the invention optimizes for both geometric stretch and deviation on all meshes in the sequence. Such optimizing according to the stretch metric of the invention creates a balanced parametrization that prevents undersampling at all locations and along all directions.

As mentioned above, while exemplary embodiments of the present invention have been described in connection with various computing devices and network architectures, the underlying concepts may be applied to any computing device or system in which it is desirable to reconstruct signals from point samples with minimal error. Thus, the techniques for providing improved signal processing in accordance with the present invention may be applied to a variety of applications and devices. For instance, the algorithm(s) of the invention may be applied to the operating system-of a computing device, provided as a separate object on the device, as part of another object, as a downloadable object from a server, as a "middle man" between a device or object and the network, as a distributed object, etc. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent parametrization achieved by the invention.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the signal processing services of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the signal processing capabilities as described in exemplary embodiments above becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A method for optimizing geometric stretch of a parametrization scheme in connection with computer graphics, comprising:

parametrizing a mesh utilizing a geometric stretch metric, wherein the geometric stretch metric is used to measure a plurality of geometric stretch metric values corresponding to how much undersampling exists for different points on the surface of the mesh in accordance with spatial relationships of the mesh, and wherein said parametrizing includes partitioning an unparametrized mesh into a plurality of charts, and wherein said partitioning includes considering geometry of the mesh; and minimizing the plurality of geometric stretch metric values to minimize undersampling over all points on the surface of the mesh.

2. A method according to claim 1, wherein the plurality of geometric stretch metric values are measured by integrating a pointwise undersampling metric over the surface area of the mesh.

3. A method according to claim 2, wherein the geometric stretch metric is based on at least one of a $L^2$ and $L^\infty$ norm, which correspond to the root mean square stretch over all directions in the domain and the maximum singular value obtained when mapping unit-length vectors from the texture domain to the surface, respectively.

4. A method according to claim 1, wherein said minimizing includes updating individual vertex positions of the chart using line searches.

5. A method according to claim 1, wherein the spatial relationships include x, y and z coordinate spatial relationships of the mesh.

6. A method according to claim 1, wherein said minimizing includes resizing polygons of said plurality of charts, and wherein said resizing is based upon geometric stretch.

7. A method according to claim 6, further comprising:

forming a texture atlas, wherein said forming includes performing a second resizing of the polygons of said plurality of charts and packing the polygons of said plurality of charts to define said texture atlas.

8. A method according to claim 7, further comprising sampling texture images based upon said texture atlas.

9. A method according to claim 8, wherein said sampling includes applying a pull-push algorithm to fill in unsampled regions.

10. A computer readable medium having stored thereon a plurality of computer-executable instructions for performing the method of claim 1.

11. A modulated data signal carrying computer executable instructions for performing the method of claim 1.

12. At least one of a coprocessing device and a computing device comprising means for performing the method of claim 1.

13. A method for optimizing geometric stretch of a parametrization scheme in connection with computer graphics, comprising:

receiving a mesh; and generating a progressive mesh (PM) sequence from said mesh utilizing a geometric stretch metric, wherein the geometric stretch metric measures a plurality of geometric stretch metric values corresponding to how much undersampling exists for different points on the surface of a mesh of said PM sequence in accordance with spatial relationships of the mesh; and wherein:

said generating includes partitioning the mesh into a plurality of charts; and said partitioning includes considering geometry of the mesh.

14. A method according to claim 13, further including minimizing the plurality of geometric stretch metric values to minimize undersampling at any point on the surface of the mesh of said PM sequence.

15. A method according to claim 14, wherein said minimizing includes updating individual vertex positions of the chart using line searches.

16. A method according to claim 13, wherein the plurality of geometric stretch metric values are measured by integrating a pointwise undersampling metric over the surface area of the mesh.

17. A method according to claim 14, wherein the geometric stretch metric is based on at least one of a $L^2$ and $L^\infty$ norm, which correspond to the root mean square stretch over all directions in the domain and the maximum singular value obtained when mapping unit-length vectors from the texture domain to the surface, respectively.

18. A method according to claim 13, wherein the spatial relationships include x, y and z coordinate spatial relationships of the mesh.

19. A method according to claim 14, wherein said minimizing is based upon minimization of texture deviation and geometric stretch over all meshes in the PM sequence.

20. A method according to claim 13, wherein said generating further includes forming an initial parametrization of said plurality of charts, wherein said forming includes minimizing geometric stretch.

21. A method according to claim 20, wherein said generating further includes resizing polygons of said plurality of charts, and wherein said resizing is based upon geometric stretch.

22. A method according to claim 21, wherein said minimizing further includes simplifying the mesh after said resizing to produce an initial PM sequence, and wherein said simplifying includes minimizing texture deviation.

23. A method according to claim 22, wherein said minimizing further includes optimizing said initial PM sequence to construct said PM sequence, and wherein said optimizing includes minimizing both geometric stretch and texture deviation over all of said initial PM sequence.

24. A method according to claim 21, further comprising:
forming a texture atlas based upon said PM sequence, wherein said forming includes performing a second resizing of the polygons of the plurality of charts and packing the polygons of the plurality of charts to define said texture atlas.

25. A method according to claim 24, further comprising sampling texture images based upon said texture atlas.

26. A method according to claim 25, wherein said sampling includes applying a pull-push algorithm to fill in unsampled regions.

27. A computer readable medium having stored thereon a plurality of computer-executable instructions for performing the method of claim 13.

28. A modulated data signal carrying computer executable instructions for performing the method of claim 13.

29. At least one of a coprocessing device and a computing device comprising means for performing the method of claim 13.

30. A method for optimizing geometric stretch of a parametrization scheme in connection with computer graphics, comprising:
partitioning a mesh into a plurality of charts utilizing a geometric stretch metric, wherein:
said partitioning includes considering geometric of the mesh; and
the geometric stretch metric measures a plurality of geometric stretch metric values corresponding to how much undersampling exists for different points on the surface of the mesh in accordance with spatial relationships of the mesh.

31. A method according to claim 30, further including minimizing the plurality of geometric stretch metric values to minimize undersampling at any point on the surface of the mesh of said PM sequence.

32. A method according to claim 31, wherein said minimizing includes updating individual vertex positions of the chart using line searches.

33. A method according to claim 30, wherein the plurality of geometric stretch metric values are measured by integrating a pointwise undersampling metric over the surface area of the mesh.

34. A method according to claim 33, wherein the geometric stretch metric is based on at least one of a $L^2$ and $L^\infty$ norm, which correspond to the root-mean-square stretch over all directions in the domain and the maximum singular value obtained when mapping unit-length vectors from the texture domain to the surface, respectively.

35. A method according to claim 30, wherein the spatial relationships include x, y and z coordinate spatial relationships of the mesh.

36. A method according to claim 30, wherein said partitioning includes scaling at least one chart area of the plurality of charts relative to at least one other chart area of the plurality of charts.

37. A method according to claim 30, wherein said partitioning includes resizing polygons of said plurality of charts, and wherein said resizing is based upon geometric stretch.

38. A computer readable medium having stored thereon a plurality of computer-executable instructions for performing the method of claim 30.

39. A modulated data signal carrying computer executable instructions for performing the method of claim 30.

40. At least one of a coprocessing device and a computing device comprising means for performing the method of claim 30.

* * * * *

UNITED STATES PATENT AND TRADEMARK OFFICE
CERTIFICATE OF CORRECTION

PATENT NO. : 6,850,233 B2
APPLICATION NO. : 10/138751
DATED : February 1, 2005
INVENTOR(S) : Hoppe et al.

It is certified that error appears in the above-identified patent and that said Letters Patent is hereby corrected as shown below:

On The Title Page, Item -56-, under "U.S. Patent Documents", line 1, above "5,963,209 A" delete "5,956,133 A * 9/1999 Imura...........345/420.".

On The Title Page, Item -56-, under "U.S. Patent Documents", line 2, below "5,963,209 A" insert -- 5,966,133 A * 10/1999 Hoppe...............345/420 --.

On The Title Page, on page 2, Item -56-, under "Other Publications", line 11, delete "Hierarachical" and insert -- Hierarchical --, therefor.

On The Title Page, on page 2, Item -56-, under "Other Publications", line 22, delete "22164" and insert -- 2164 --, therefor.

On The Title Page, on page 2, Item -56-, under "Other Publications", line 45, after "Eurographics" delete "'95" and insert -- '98 --, therefor.

On The Title Page, on page 2, Item -56-, under "Other Publications", line 1, delete "tetxure" and insert -- texture --, therefor.

On The Title Page, on page 2, Item -56-, under "Other Publications", line 7, after "Murata," delete "II" and insert -- H --, therefor.

On The Title Page, on page 2, Item -56-, under "Other Publications", line 17, after "137(3)" delete ";" and insert -- , --, therefor.

On The Title Page, on page 2, Item -56-, under "Other Publications", line 47, delete "et al," and insert -- et al., --, therefor.

In column 2, line 9, delete "technmques" and insert -- techniques --, therefor.

In column 2, line 54, delete "Horman" and insert -- Hormann --, therefor.

In column 4, line 51, delete "ereating" and insert -- creating --, therefor.

In column 11, line 12, delete "NET" and insert -- .NET --, therefor.

In column 11, line 20, delete "NET" and insert -- .NET --, therefor.

In column 11, line 35, delete "NET's" and insert -- .NET's --, therefor.

UNITED STATES PATENT AND TRADEMARK OFFICE
CERTIFICATE OF CORRECTION

PATENT NO. : 6,850,233 B2
APPLICATION NO. : 10/138751
DATED : February 1, 2005
INVENTOR(S) : Hoppe et al.

It is certified that error appears in the above-identified patent and that said Letters Patent is hereby corrected as shown below:

In column 13, line 22, after "i.e." and insert -- , --.

In column 17, line 42, delete "optimize vertex(v)" and insert -- optimize_vertex(v) --, therefor.

In column 17, line 48, delete "binaiy" and insert -- binary --, therefor.

In column 17, line 55, delete "over neighborhood" and insert -- over_neighborhood --, therefor.

In column 17, line 58, after "Ψ'" insert -- . --.

In column 17, line 59, delete "original neighbors" and insert -- original_neighbors --, therefor.

In column 17, line 60, delete "deviation error" and insert -- deviation_error --, therefor.

In column 17, line 60, delete "original neighbors" and insert -- original_neighbors --, therefor.

In column 20, line 52, delete "system-of" and insert -- system of --, therefor.

In column 23, line 19, in Claim 20, after "charts," insert -- and --.

In column 24, line 7, in Claim 30, delete "geometric" and insert -- geometry --, therefor.

Signed and Sealed this

Seventh Day of April, 2009

JOHN DOLL
*Acting Director of the United States Patent and Trademark Office*